US009262700B2

(12) United States Patent
Tanikawa et al.

(10) Patent No.: US 9,262,700 B2
(45) Date of Patent: Feb. 16, 2016

(54) IMAGE PROCESSING DEVICE AND METHOD OF DETECTING MISSING DOTS IN AN IMAGE PROCESSING DEVICE

(71) Applicant: Seiko Epson Corporation, Tokyo (JP)

(72) Inventors: Kazuya Tanikawa, Shiojiri (JP);
Yoshiaki Kinoshita, Matsumoto (JP);
Atsushi Natsuno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 14/226,278

(22) Filed: Mar. 26, 2014

(65) Prior Publication Data

US 2014/0294248 A1 Oct. 2, 2014

(30) Foreign Application Priority Data

Mar. 26, 2013 (JP) ................................. 2013-063541
Mar. 26, 2013 (JP) ................................. 2013-063542

(51) Int. Cl.
*G06K 9/00* (2006.01)
*G06K 15/02* (2006.01)
*B41J 2/21* (2006.01)

(52) U.S. Cl.
CPC ............. *G06K 15/027* (2013.01); *B41J 2/2142* (2013.01); *B41J 2/2146* (2013.01)

(58) Field of Classification Search
CPC ................................................... G06K 15/02
USPC ........................................................ 382/112
See application file for complete search history.

(56) References Cited

U.S. PATENT DOCUMENTS

| 2002/0070997 A1* | 6/2002 | Nakagawa et al. .... B41J 2/2132 347/37 |
| 2005/0030327 A1 | 2/2005 | Tatsumi |
| 2006/0023018 A1 | 2/2006 | Hatayama |
| 2006/0071955 A1* | 4/2006 | Arazaki ............................ 347/5 |
| 2008/0055354 A1 | 3/2008 | Miyazaki |
| 2013/0187973 A1* | 7/2013 | De Smet et al. ........ B41J 2/0451 347/14 |
| 2013/0215176 A1* | 8/2013 | Hatano .......................... 347/14 |

FOREIGN PATENT DOCUMENTS

| JP | 2003-060894 A | 2/2003 |
| JP | 2005-067191 A | 3/2005 |
| JP | 2006-035727 A | 2/2006 |
| JP | 2007-041832 A | 2/2007 |
| JP | 2008-062449 A | 3/2008 |
| JP | 2011-101964 A | 5/2011 |

* cited by examiner

*Primary Examiner* — Gregory F Cunningham
(74) *Attorney, Agent, or Firm* — Nutter McClennen & Fish LLP; John J. Penny, Jr.; Joshua I. Rudawitz

(57) ABSTRACT

An image processing device for detecting a large number of missing dots. The image processing device comprises a print data image acquisition unit that acquires a print data image; an inkjet printer unit that prints on the back of a check; a back CIS unit that scans the back of the printed check; a print area extraction unit that extracts a print area R from the scanned image of the back of the check as an extracted image; and a missing dot detection unit determines if there are missing dots based on the print data image and the extracted image extracted by the print area extraction unit.

21 Claims, 21 Drawing Sheets

PRINT DATA IMAGE

SCANNED IMAGE

SCANNED IMAGE

EXTRACTED IMAGE

VERTICAL (Y-AXIS) DIRECTION (NOZZLE ROW DIRECTION)

CALCULATE TOTAL NUMBER OF CHARACTER PIXELS IN EACH RECTANGULAR BAND WHILE SHIFTING RECTANGULAR BAND DOWN ONE DOT AT A TIME

STOP WHEN RECTANGULAR BAND REACHES BOTTOM

GRAPH OF FEATURE VALUES OF EXTRACTED IMAGE TO PRINT DATA IMAGE

SCANNED IMAGE

EXTRACTED IMAGE WITH MARGINS

HORIZONTAL HISTOGRAM OF PRINT DATA IMAGE

HORIZONTAL HISTOGRAM OF PRINT DATA IMAGE WITH MARGINS

GRAPH OF TOTAL OF ABSOLUTE VALUES OF DIFFERENCES
IN HORIZONTAL HISTOGRAMS OF BOTH IMAGES

VERTICAL HISTOGRAM OF PRINT DATA IMAGE

VERTICAL HISTOGRAM OF PRINT DATA IMAGE WITH MARGINS

GRAPH OF TOTAL OF ABSOLUTE VALUES OF DIFFERENCES
IN VERTICAL HISTOGRAMS OF BOTH IMAGES

EXTRACTED IMAGE WITH MARGINS

EXTRACTED IMAGE

IMAGE PROCESSING DEVICE AND METHOD OF DETECTING MISSING DOTS IN AN IMAGE PROCESSING DEVICE

Priority is claimed under 35 U.S.C. §119 from Japanese patent application nos. JP 2013-063541 filed on Mar. 26, 2013 and JP 2013-063542 filed on Mar. 26, 2013, which are hereby incorporated by reference in their entirety.

BACKGROUND

1. Technical Field

The present invention relates to an image processing device having an inkjet head, and to a method of detecting missing dots in the image processing device.

2. Related Art

An inkjet printer that prints by ejecting ink onto the recording medium is one type of image processing device known from the literature. The ink nozzles of an inkjet printer can become clogged when ink dries in a nozzle or the printer is subject to vibration, resulting in the inkjet printer not ejecting ink normally. When this happens, ink does not land on the recording medium and white bands, for example, may be formed in the printed image (characters or graphics) due to the missing dots, resulting in a drop in image quality.

JP-A-2006-35727 teaches a method of checking whether or not ink is discharged normally from the inkjet head set (each nozzle of the inkjet head) when printing images with an inkjet printer (referred to herein as "missing dot detection"). The inkjet printer taught in JP-A-2006-35727 inspects each nozzle of each inkjet head nozzle row to determine if the nozzle is discharging normally by printing a test pattern on the recording medium with the inkjet head set, reading the test pattern with a line CCD, and comparing the read test pattern with inspection data previously stored in memory.

Checking for missing dots nozzle by nozzle using a test pattern as described above can prevent missing dots resulting from ink ejection problems and improve print quality. However, there are situations in which a printing problem (misprint) is detected only if so many dots are missing that characters cannot be read (if there are many consecutive missing dots), and a certain number of missing dots in the printout is acceptable (do not need to result in a misprint determination) if the characters can be read. In this situation, inspecting for missing dots nozzle by nozzle in each inkjet head nozzle row as described in JP-A-2006-35727 is inefficient.

Furthermore, because inspection using a test pattern is conducted at scheduled times, such as before the printing process starts, noticing that dots are missing (that there is an ink ejection problem) may not be possible until the user sees the actual printout when dots start missing in the middle of a long continuous printing process, for example. If a large volume of printing has already been completed when missing dots are noticed after the printing process starts, the printing process must be repeated, thus wasting time and money.

JP-A-2006-35727 teaches inspecting for ink ejection problems by printing a test pattern on a recording medium with the inkjet head set, reading the test pattern with a line CCD, and comparing the read test pattern with inspection data previously stored in memory. However, JP-A-2006-35727 is silent about technology related to the printing position shifting when printing the test pattern with the inkjet head set. Conveyance (paper feed) of the recording medium may not be consistent, and the printing position of the test pattern may be shifted from the expected printing position (the position specified by the printer driver), when printing with the inkjet head.

As a result, the inspection method taught in JP-A-2006-35727 may analyze an area offset from the expected printing position due to deviation in the position of the printed area, resulting in false detection of missing dots (a misprint) even though ink is discharged (ejected) normally.

SUMMARY

An image processing device and a control method of an image processing device according to at least one embodiment of the present invention enable easily and efficiently detecting large volumes of missing dots. An image processing device and a missing dot detection method of an image processing device according to at least one embodiment of the present invention also enable accurately identifying the location of the image printed on the recording medium used for missing dot detection.

An image processing device according to at least one embodiment of the present invention comprises a print data image acquisition unit that acquires a print data image based on print data; a print unit that executes a printing process based on the print data on a recording medium by ejecting ink from an inkjet head with a nozzle row of plural nozzles in a line and forming dots; a scanning unit that captures a scanned image of the recording medium after printing thereon by the print unit; a print area extraction unit that extracts a printed area of the scanned image of the recording medium captured by the scanning unit as an extracted image; and a missing dot detection unit that detects if there are missing dots based on the print data image and the extracted image of the printed area extracted by the print area extraction unit.

Preferably, the missing dot detection unit comprises a character pixel count calculator that calculates the character pixel count in each rectangular area of a specific width in the nozzle row direction of the inkjet head in the print data image and the extracted image; a ratio calculator that calculates the ratio of the character pixel count of the extracted image to the character pixel count of the print data image in each rectangular area; and a missing dot evaluation unit that determines there are missing dots in the rectangular area when the calculated character pixel count ratio is less than or equal to a preset threshold value.

In an image processing device according to another aspect of at least one embodiment of the present invention, the specific width of the rectangular area is set based at least on the font size of the smallest printable font.

In an image processing device according to another aspect of at least one embodiment of the present invention, the specific width of the rectangular area is set based on the line spacing set in the print data in addition to the font size of the smallest printable font.

An image processing device according to another aspect of at least one embodiment of the present invention also comprises a printing position information acquisition unit that acquires printing position information indicating the print area of the print data on the recording medium; and the print area extraction unit extracts the printed area from the scanned image based on the acquired printing position information.

An image processing device according to another aspect of at least one embodiment of the present invention also comprises a resolution conversion unit that converts the resolution of the print data image generated based on the print resolution to the resolution of the scanning unit when the print resolution of the inkjet head and the scanning resolution of the scanning unit differ; and the character pixel count calculator calculates the character pixel count of the print data image at the converted resolution.

An image processing device according to another aspect of at least one embodiment of the present invention also comprises a notification unit that reports when the missing dot detection unit determines there are missing dots.

An image processing device according to another aspect of at least one embodiment of the present invention also comprises a histogram generator that counts the number of character pixels on the x-axis and y-axis of the print data image and the scanned image, and generates projection histograms; and the print area extraction unit extracts the printed area in the scanned image based on the result of comparing the projection histogram of the print data image and the projection histogram of the scanned image generated by the histogram generator.

An image processing device according to another aspect of at least one embodiment of the present invention also comprises a printing position information acquisition unit that acquires printing position information indicating the print area of the print data on the recording medium; and a print area with margins extraction unit that extracts a print area with margins adding specific margins around the print area based on the printing position information from the scanned image; and the histogram generator generates a projection histogram of an extracted image with margins indicating the print area with margins.

In an image processing device according to another aspect of at least one embodiment of the present invention, the missing dot detection unit comprises a character pixel count calculator that calculates the character pixel count in each rectangular area of a specific width in the nozzle row direction of the inkjet head in the print data image and the extracted image; a ratio calculator that calculates the ratio of the character pixel count of the extracted image to the character pixel count of the print data image in each rectangular area; and a missing dot evaluation unit that determines there are missing dots in the rectangular area when the calculated character pixel count ratio is less than or equal to a preset threshold value.

Another aspect of at least one embodiment of the present invention is a missing dot detection method of an image processing device comprising a print unit that executes a printing process based on print data on a recording medium by ejecting ink from an inkjet head with a nozzle row of plural nozzles in a line and forming dots, and a scanning unit that captures a scanned image of the recording medium after printing thereon by the print unit, the missing dot detection method including: acquiring a print data image based on the print data; extracting a printed area of the scanned image of the recording medium captured by the scanning unit as an extracted image; and detecting if there are missing dots based on the print data image and the extracted image of the printed area extracted from the scanned image.

A missing dot detection method of an image processing device according to another aspect of at least one embodiment of the present invention also comprises: calculating the character pixel count in each rectangular area of a specific width in the nozzle row direction of the inkjet head in the print data image and the extracted image; calculating the ratio of the character pixel count of the extracted image to the character pixel count of the print data image in each rectangular area; and determining there are missing dots in the rectangular area when the calculated character pixel count ratio is less than or equal to a preset threshold value.

A missing dot detection method of an image processing device according to another aspect of at least one embodiment of the present invention also comprises setting the specific width of the rectangular area based at least on the font size of the smallest printable font.

A missing dot detection method of an image processing device according to another aspect of at least one embodiment of the present invention also comprises setting the specific width of the rectangular area based on the line spacing set in the print data in addition to the font size of the smallest printable font.

A missing dot detection method of an image processing device according to another aspect of at least one embodiment of the present invention also comprises acquiring printing position information indicating the print area of the print data on the recording medium; extracting the printed area as an extracted image extracting the printed area from the scanned image based on the acquired printing position information.

A missing dot detection method of an image processing device according to another aspect of at least one embodiment of the present invention also comprises converting the resolution of the print data image generated based on the print resolution to the resolution of the scanning unit when the print resolution of the inkjet head and the scanning resolution of the scanning unit differ; calculating the character pixel count calculating the character pixel count of the print data image at the converted resolution.

A missing dot detection method of an image processing device according to another aspect of at least one embodiment of the present invention also comprises reporting when the missing dot detection unit determines there are missing dots.

A missing dot detection method of an image processing device according to another aspect of at least one embodiment of the present invention also comprises counting the number of character pixels on the x-axis and y-axis of the print data image and the scanned image, and generating projection histograms; extracting the printed area in the scanned image extracting the printed area in the scanned image based on the result of comparing the projection histogram of the print data image and the projection histogram of the scanned image that were generated.

A missing dot detection method of an image processing device according to another aspect of at least one embodiment of the present invention also comprises acquiring printing position information indicating the print area of the print data on the recording medium; and extracting a print area with margins and adding specific margins around the print area based on the printing position information from the scanned image; and generating a projection histogram of an extracted image with margins indicating the print area with margins.

In a missing dot detection method of an image processing device according to another aspect of at least one embodiment of the present invention, the missing dot detection step comprises calculating the character pixel count in each rectangular area of a specific width in the nozzle row direction of the inkjet head in the print data image and the extracted image; calculating the ratio of the character pixel count of the extracted image to the character pixel count of the print data image in each rectangular area; and determining there are missing dots in the rectangular area when the calculated character pixel count ratio is less than or equal to a preset threshold value.

Another embodiment of the present invention is a non-transitory computer-readable storage medium storing a program executed by the control unit of an image processing device including a print unit that executes a printing process based on print data on a recording medium by ejecting ink from an inkjet head with a nozzle row of plural nozzles in a line and forming dots, and a scanning unit that captures a scanned image of the recording medium after printing thereon by the print unit, the program causes the control unit to: acquire a print data image based on the print data; extract a printed area of the scanned image of the recording medium captured by the scanning unit as an extracted image; and detect if there are missing dots based on the print data image and the extracted image of the printed area extracted from the scanned image.

As used herein, "printing" means printing (recording) a character or graphic (image). A "print data image" means an image (bitmap image) of the print data written to a print buffer.

Other objects and attainments together with a fuller understanding of the invention will become apparent and appreciated by referring to the following description and claims taken in conjunction with the accompanying drawings.

DESCRIPTION OF EMBODIMENTS

Embodiment 1

An image processing device and a missing dot detection method of an image processing device according to a first embodiment of the present invention are described below with reference to the accompanying figures. This embodiment describes a multifunction device having a printing function and a scanning function for reading printed recording media as an example of an image processing device.

Figure 1:
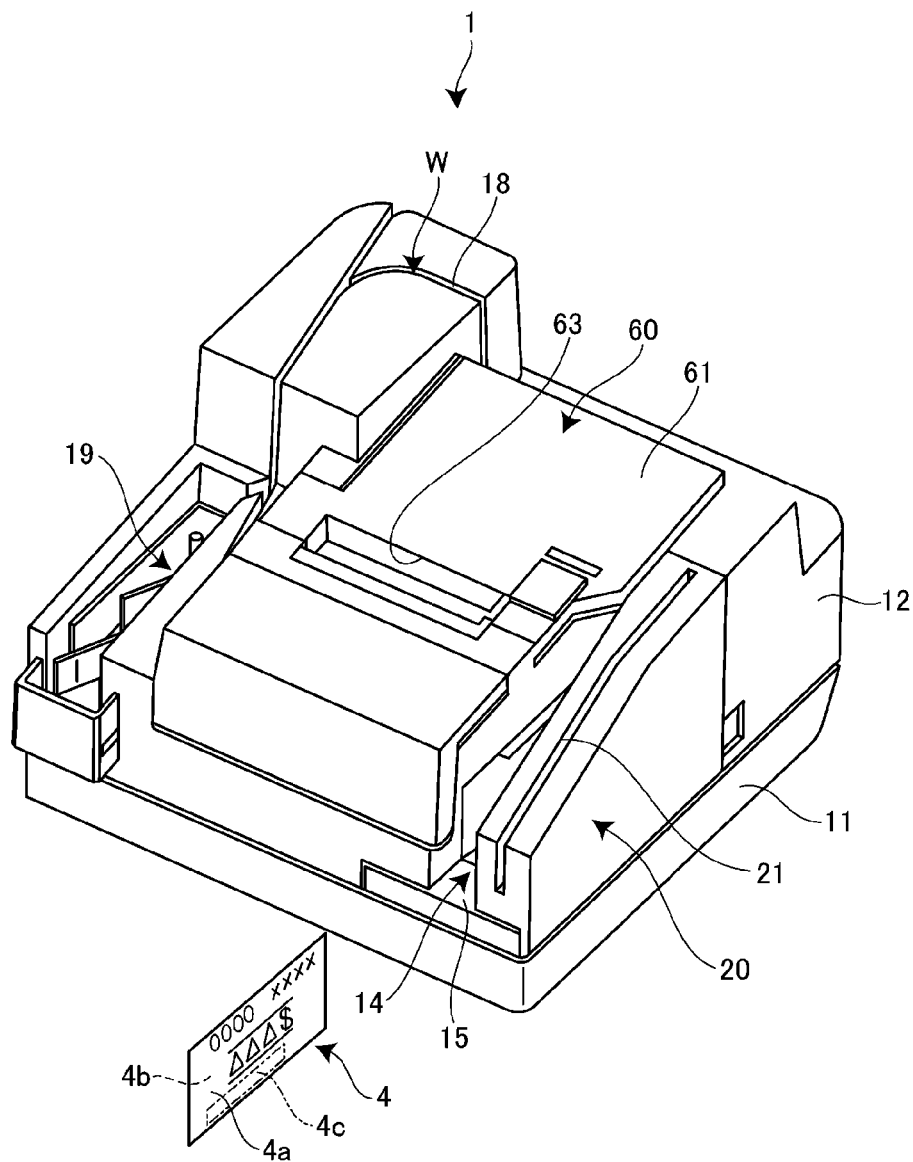
FIG. 1 is an external oblique view of a multifunction device according to some embodiments.

FIG. 1 is an oblique view of a multifunction device 1 (image processing device) according to a first embodiment of the invention. The multifunction device 1 is a device that can process checks 4, forms, and other types of cut-sheet target media (recording media) in multiple ways, including reading magnetic ink characters recorded on the target medium, optically imaging (scanning) both sides of the target medium, and printing images (characters or graphics) on the target medium.

The multifunction device 1 also functions as a card reader that reads magnetic information recorded on card media such as credit cards, and functions as a printer to produce tickets with an image printed thereon by printing an image on thermal roll paper and cutting the paper.

This embodiment of the invention describes processing checks 4 as an example of the target medium.

As shown in FIG. 1, a check 4 is a form having a payment amount, payee, serial number, payer signature, and other information printed or recorded on a sheet with a specific colored or patterned background. The payment amount, payee, serial number, payer signature, and other information are recorded on the face 4a. An MICR line 4c is also printed along the length of the check 4 on the face 4a of the check 4. The MICR line 4c is a line of magnetic ink characters printed with magnetic ink, and can be read magnetically and optically.

An endorsement area is provided on the back 4b of the check 4. A specific endorsement image is recorded in the endorsement area by an inkjet head 10 as described below.

The lengths of the short and long sides of a check 4 are standardized, but because there are different standards, there are different sizes of checks 4 in practice. The multifunction device 1 defines a maximum check size that includes substantially all commonly used sizes of checks 4, and can process any check 4 within this maximum size.

As shown in FIG. 1, the outside case of the multifunction device 1 includes a bottom case 11 that covers the bottom part of the multifunction device 1, and a cover 12 that covers the bottom case 11, and the main unit 13 (FIG. 2) of the multifunction device 1 is housed inside this outside case. An entrance 14 for inserting checks 4 is open at the front of the multifunction device 1, and a stacker 15 that can hold a stack of plural checks 4 is provided inside the entrance 14. The stacker 15 can be pulled out to the front, and the checks 4 can be loaded into the stacker 15 after adjusting the stacker 15 to the size of the checks 4 to be stored in the stacker 15.

A slot 18 that is substantially U-shaped when seen from above and is used as the conveyance path W of the checks 4 is formed in the cover 12. The slot 18 communicates with the stacker 15, and the slot 18 communicates with an exit pocket 19 at the front of the multifunction device 1. Checks 4 stored in the stacker 15 are fed one by one into the multifunction device 1 as described below, are processed as they pass through the slot 18 (conveyance path W), and the processed checks 4 are discharged into the exit pocket 19. Multiple checks 4 can accumulate in the exit pocket 19.

A magnetic card reader 20 is disposed beside the stacker 15. The magnetic card reader 20 includes a card slot 21 formed in the cover 12, and a MCR (magnetic card reader) head 22 (FIG. 4) disposed facing the card slot 21, and reads information magnetically recorded on cards passing through the card slot 21 with the MCR head 22.

Figure 2:
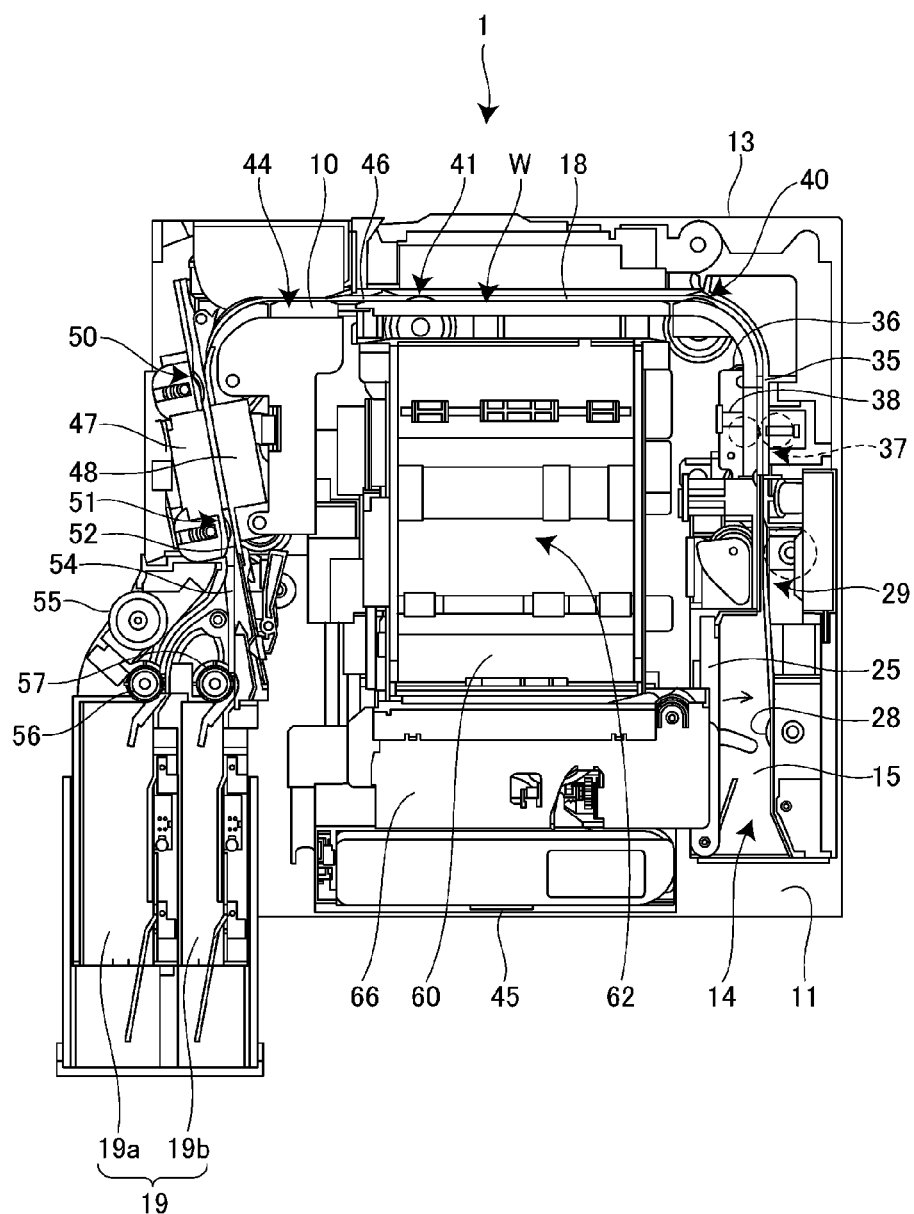
FIG. 2 shows the internal configuration of the multifunction device.

FIG. 2 is a plan view showing the configuration of the main unit 13 of the multifunction device 1 housed the outside case.

As shown in FIG. 2, a hopper 25 is disposed on one side of the stacker 15. The hopper 25 can pivot in the direction of the arrow by means of a hopper drive motor 26 (FIG. 4), and pushes the checks 4 in the stacker 15 to the other side.

A pickup roller 28 driven by an ASF (automatic sheet feeder) motor 27 (FIG. 4) described below is disposed on the other side of the stacker 15, and when the hopper 25 pivots toward the pickup roller 28, one check 4 in the stacker 15 is urged as the hopper 25 pivots to the pickup roller 28, contacts the roller, and is pulled into the conveyance path W by rotation of the pickup roller 28.

An ASF roller set 29 composed of a pair of rollers is disposed downstream from the stacker 15. The two rollers of the ASF roller set 29 are disposed on opposite sides of the conveyance path W, one roller is driven by the ASF motor 27, and the other roller is a follower roller. The check 4 in contact with the pickup roller 28 is nipped by the ASF roller set 29, and conveyed downstream through the slot 18.

An ASF paper detector 31 (FIG. 4) is disposed at a specific position in the stacker 15. The ASF paper detector 31 can be a transmissive photosensor in this embodiment, and detects if a check 4 is in the stacker 15.

A hopper position detector 32 (FIG. 4) is disposed at the standby position of the hopper 25 in the stacker 15. The hopper position detector 32 can be a transmissive photosensor in this embodiment, and detects if the hopper 25 is in the standby position.

A MICR (magnetic ink character recognition) head 35 that contacts the face 4a of the check 4 and magnetically reads the MICR line 4c (FIG. 1) is disposed downstream from the ASF roller set 29. A MICR roller 36 is disposed opposite the MICR head 35. The MICR roller 36 is pushed to the MICR head 35 side, rotates while pressing the check 4 against the MICR head 35, and conveys checks 4 at a speed suited to reading the MICR line. An assist roller set 37 composed of a pair of rollers that guide the check 4 fed by the ASF roller set 29 to the MICR head 35 is disposed on the upstream side of the MICR head 35.

A paper length detector 38 is disposed in the conveyance path W between the assist roller set 37 and MICR head 35. The paper length detector 38 is a reflective photosensor in this embodiment, and detects the leading end and trailing end of each check 4 by detecting if a check 4 passing through the conveyance path W is at the detection position. The length of the check 4 is determined based on change in the output from the paper length detector 38.

A first conveyance roller set 40 including a pair of rollers disposed on opposite sides of the conveyance path W is disposed in the conveyance path W on the downstream side of the MICR head 35, and a second conveyance roller set 41 is disposed downstream from the first conveyance roller set 40. The first conveyance roller set 40 and second conveyance roller set 41 are driven rotationally by a conveyance motor 42 (FIG. 4), and these rollers convey the check 4 to the inkjet printer unit 44 (print unit).

Figure 3:
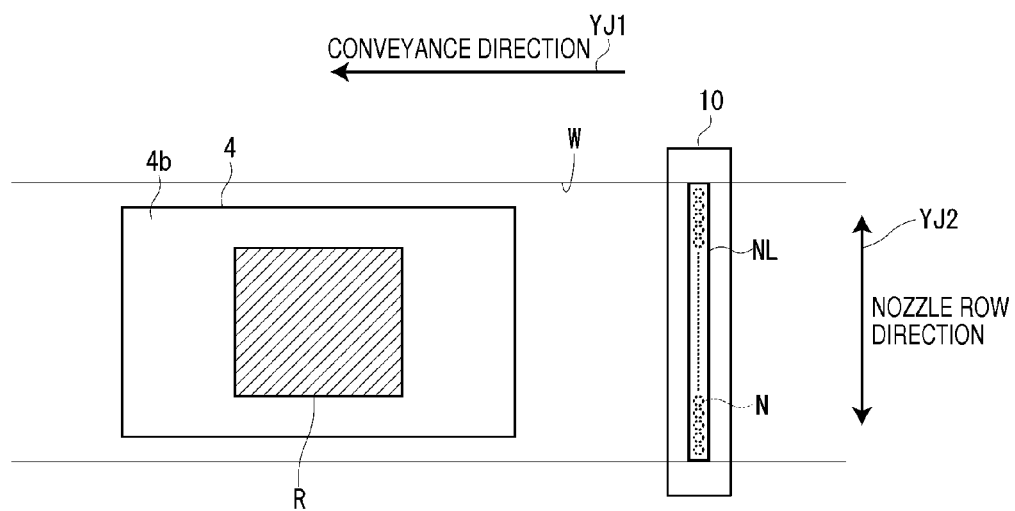
FIG. 3 schematically describes the configuration of an inkjet head.

The inkjet printer unit 44 has an inkjet head 10. The inkjet head 10 is an inkjet printhead that is supplied with ink from an ink cartridge 45 installed in the front part of the main unit 13 and ejects ink onto the check 4. As shown in FIG. 3, the inkjet head 10 can be inkjet line head.

The nozzle row NL of plural nozzles N arrayed in a line extends in a direction (below, nozzle row direction YJ2) intersecting the conveyance direction YJ1 of a check 4 on the conveyance path W. Images can be printed across a wide band (substantially the full length of the nozzle row direction YJ2 on a check 4) in the nozzle row direction YJ2 of the check 4 (vertically across the check 4). When printing on a check 4, ink is selectively discharged from the appropriate nozzles N of the stationary inkjet head 10 (nozzle row NL) and an image is printed on the back 4b of a check 4 conveyed at a constant speed in the conveyance direction YJ1. FIG. 3 shows an image printed in the shaded part (the print area R) of the check 4. The image printed on the back 4b of the check 4 (print area R) is called an endorsement, and may include text and symbols. Note that FIG. 3 shows an exemplary inkjet head 10 with one nozzle row NL, but the inkjet head 10 could have plural nozzle rows NL.

Referring again to FIG. 2, a n intermediate detector 46 is disposed on the upstream side of the inkjet head 10 between the inkjet head 10 and second conveyance roller set 41. The intermediate detector 46 is a reflective photosensor in this embodiment, and detects if a check 4 is at the detection position.

A CIS (contact image sensor) unit for optically reading checks 4 is disposed downstream from the inkjet head 10. This CIS unit includes a front CIS unit 47 for imaging the face 4a of the check 4, and a back CIS unit 48 (reading unit) for imaging the back 4b, and can thus optically image both sides of each check 4. The front CIS unit 47 and back CIS unit 48 are disposed on opposite sides of the conveyance path W. A first CIS roller 50 is disposed on the upstream side, and a second CIS roller 51 is disposed on the downstream side, of the front CIS unit 47 and back CIS unit 48. The first CIS roller 50 and second CIS roller 51 are rollers that are driven rotationally by the conveyance motor 42. Checks 4 are conveyed by the first CIS roller 50 and second CIS roller 51 at a stable speed while being imaged by the CIS units.

A discharge detector 52 is located downstream from the second CIS roller 51. The discharge detector 52 is a reflective photosensor in this embodiment, and detects if a check 4 is at the detection position.

The exit pocket 19 described above is located downstream from the front CIS unit 47 and back CIS unit 48. The exit pocket 19 is divided into a main pocket 19a and a sub-pocket 19b, and the slot 18 splits and is connected to both the main pocket 19a and sub-pocket 19b. The main pocket 19a and sub-pocket 19b can each hold a plurality of checks 4.

A flapper 54 that switches in order to control the exit pocket 19 into which the check 4 is discharged (i.e., the main pocket 19a or sub-pocket 19b) is disposed at the position where the slot 18 splits.

The flapper 54 is a guide that by closing the path to the main pocket 19a or the path to the sub-pocket 19b guides the check 4 into the other pocket, and is driven by the flapper drive motor 55.

A discharge roller 56 is disposed in the path from the flapper 54 to the main pocket 19a, another discharge roller 57 is disposed in the path from the flapper 54 to the sub-pocket 19b, and the checks 4 are thus smoothly discharged by these rollers and guided by the flapper 54 into the appropriate exit pocket 19a or 19b.

The multifunction device 1 discharges the check 4 into the main pocket 19a when the check 4 is determined to have been correctly loaded based on the result of the MICR head 35 reading the MICR line 4c, and into the sub-pocket 19b when the check 4 is determined to have not been correctly loaded.

As shown in FIG. 1 and FIG. 2, a thermal printer unit 60 for printing tickets with an image printed thereon is provided in the middle of the multifunction device 1.

A shown in FIG. 1, the thermal printer unit 60 has a printer cover 61 covering the top of the unit. This printer cover 61 is attached to the cover 12 so that the printer cover 61 can open and close freely. When the printer cover 61 is open, a roll paper compartment 62 (FIG. 2), which is a space for holding thermal roll paper, is exposed and the thermal roll paper can be installed or replaced. A paper exit 63 is formed in the printer cover 61, and the thermal roll paper held in the roll paper compartment 62 can be discharged through the paper exit 63.

The thermal printer unit 60 includes a roller platen (not shown in the figure) that supplies and feeds thermal roll paper from the roll paper compartment 62 through the conveyance path, a thermal head 65 (FIG. 4) disposed opposite the platen, and a cutter unit 66 that cuts the thermal roll paper perpendicularly to the conveyance direction. To produce a ticket, the thermal printer unit 60 prints an image on the thermal roll paper with the thermal head 65 while driving the platen and conveying the thermal roll paper in the conveyance direction, and then cuts the thermal roll paper at a specific position with the cutter unit 66 to produce a ticket.

Figure 4:
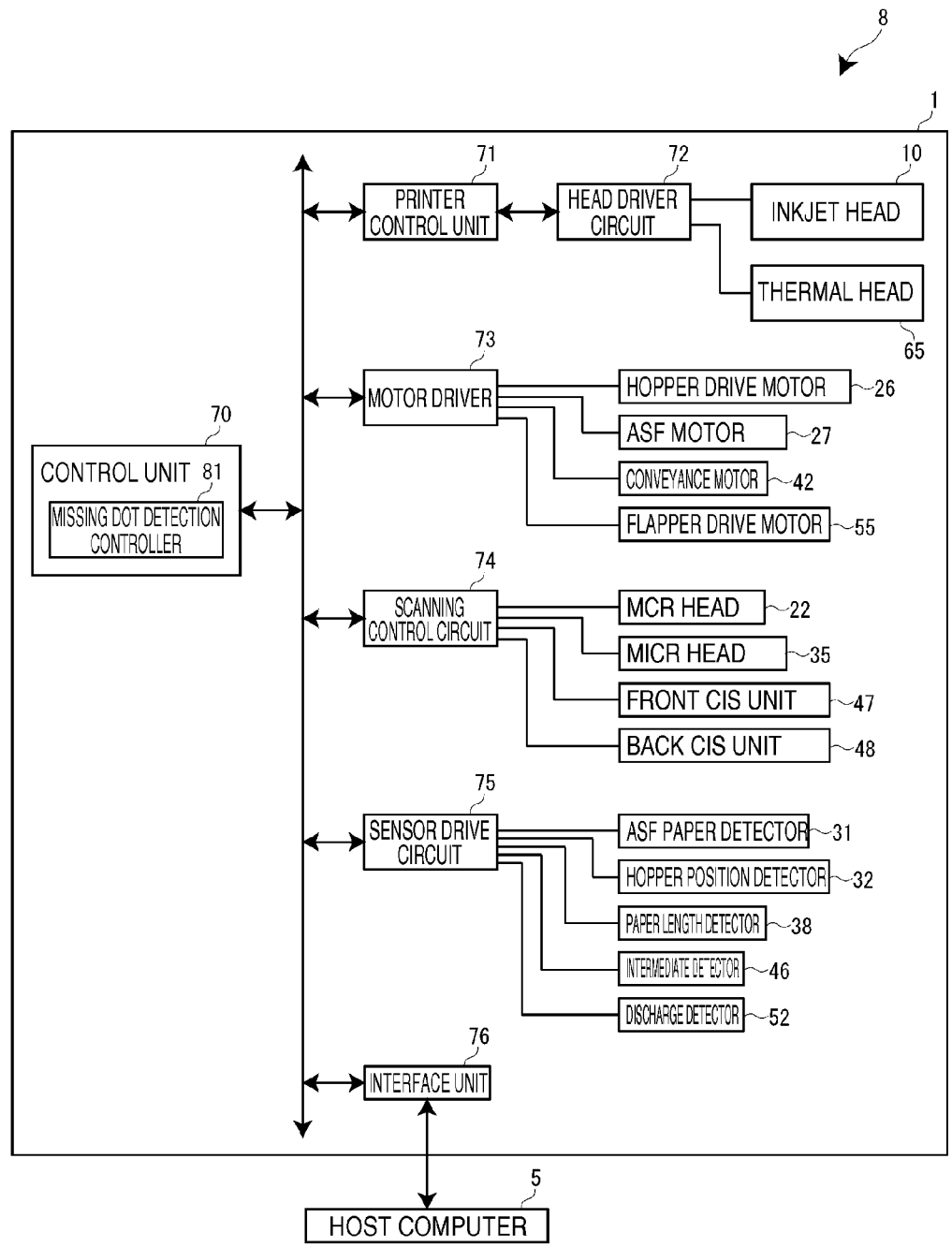
FIG. 4 is a block diagram showing the functional configuration of the multifunction device and host computer.

FIG. 4 is a block diagram showing the functional configuration of a multifunction processing system 8 composed of the multifunction device 1 connected to a host computer 5 (control device).

The multifunction device 1 includes a control unit 70 including a CPU, RAM, flash ROM, and other peripheral circuits that controls the multifunction device 1; a printer control unit 71 that controls the inkjet printer unit 44 and the thermal printer unit 60; and a head driver circuit 72, a motor driver 73, a scanning control circuit 74, a sensor drive circuit 75, and interface unit 76. These various parts are connected to communicate with each other.

The control unit 70 controls other parts of the multifunction device 1 by means of the CPU reading and running firmware stored in flash ROM.

The control unit 70 also acts as a missing dot detection controller 81 by executing a control program. The missing dot detection controller 81 detects if there are missing dots in the image printed on the back 4b of the check 4 (in the print area R) by the inkjet head 10, that is, detects ink ejection problems in the nozzles N of the inkjet head 10. The presence of missing dots is detected in this embodiment as described in detail below by comparing an image generated based on the print data to be printed on the back 4b of the check 4 with the image that is actually printed on the back 4b of the check 4 based on the print data. Specific function blocks of the missing dot detection controller 81 comprise a print data image acquisition unit, a resolution conversion unit, a printing position information acquisition unit, a character pixel count calculator, a ratio calculator, a histogram generator, a print area extraction unit, a missing dot evaluation unit, and a print area with margins extraction unit.

The printer control unit 71 supplies drive current to the inkjet head 10 through the head driver circuit 72 to print on a check 4. The printer control unit 71 also supplies drive current to the thermal head 65 through the head driver circuit 72 to print on thermal roll paper.

The motor driver 73 is connected to the hopper drive motor 26 and causes the hopper 25 to pivot. The motor driver 73 is also connected to the ASF motor 27 and the conveyance motor 42, outputs drive current or drive pulses to the motors and drives the motors, and drives the rollers connected to the motors. The motor driver 73 is also connected to the flapper drive motor 55, moves the flapper 54 by outputting drive current or drive pulses to the motor, and switches the exit pocket 19 to which the check 4 is discharged to the main pocket 19a side or the sub-pocket 19b side.

The scanning control circuit 74 is connected to the MCR head 22, MICR head 35, front CIS unit 47, and back CIS unit 48. The scanning control circuit 74 causes the MCR head 22 to read the magnetic information when a card is swiped through the card slot 21 (FIG. 1). The scanning control circuit 74 also reads magnetic information with the MICR head 35. The scanning control circuit 74 also drives the front CIS unit 47 and back CIS unit 48 to scan the face 4a and back 4b of the check 4.

The sensor drive circuit 75 is connected to the ASF paper detector 31, hopper position detector 32, paper length detector 38, intermediate detector 46, and discharge detector 52, supplies current to these detectors, gets the output values therefrom at specific times, and digitizes and outputs the acquired detection values to the control unit 70.

The interface unit 76 is connected to the host computer 5 by wire or wirelessly, and exchanges data with the host computer 5 according to a known protocol as controlled by the control unit 70.

The process whereby the multifunction device 1 according to the first embodiment of the invention detects missing dots is described next with reference to FIG. 5 to FIG. 11. As described above, missing dots are detected by the missing dot detection controller 81 comparing an image generated from the print data to be printed on the back 4b of the check 4 with the image that is actually printed on the back 4b of the check 4 based on the print data, and the main purpose of this process is to detect if dots are missing to the extent that an image (characters) printed on the back 4b of the check 4 cannot be read.

Figure 5:
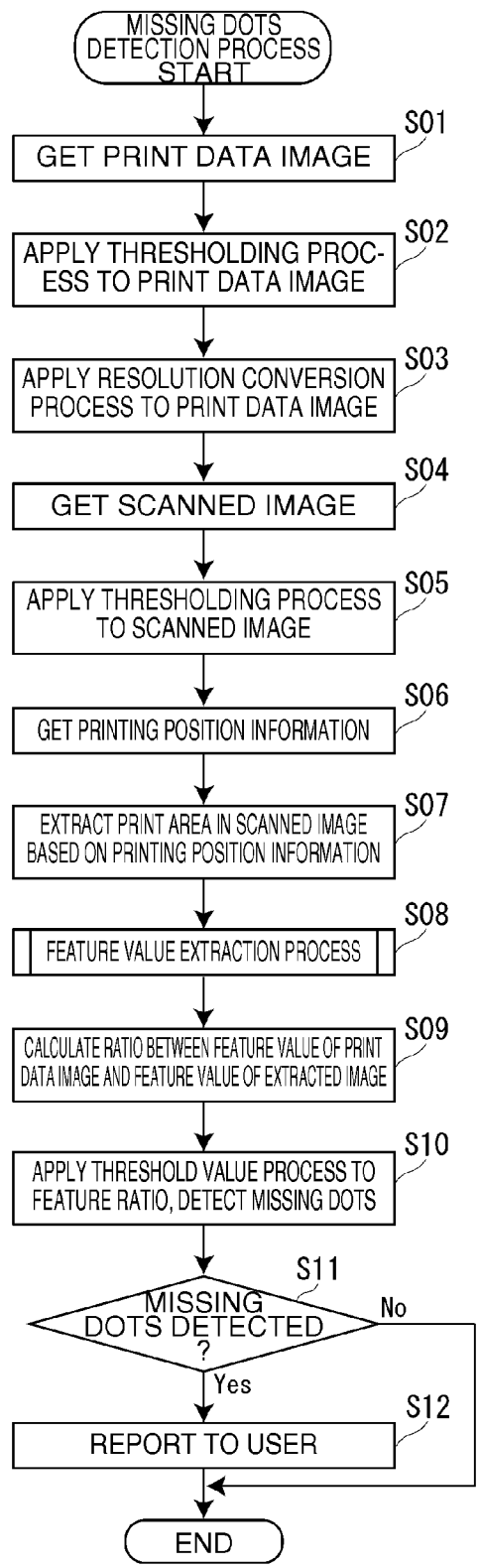
FIG. 5 is a flow chart describing the missing dot detection process in a first embodiment of the invention.
Figure 6:
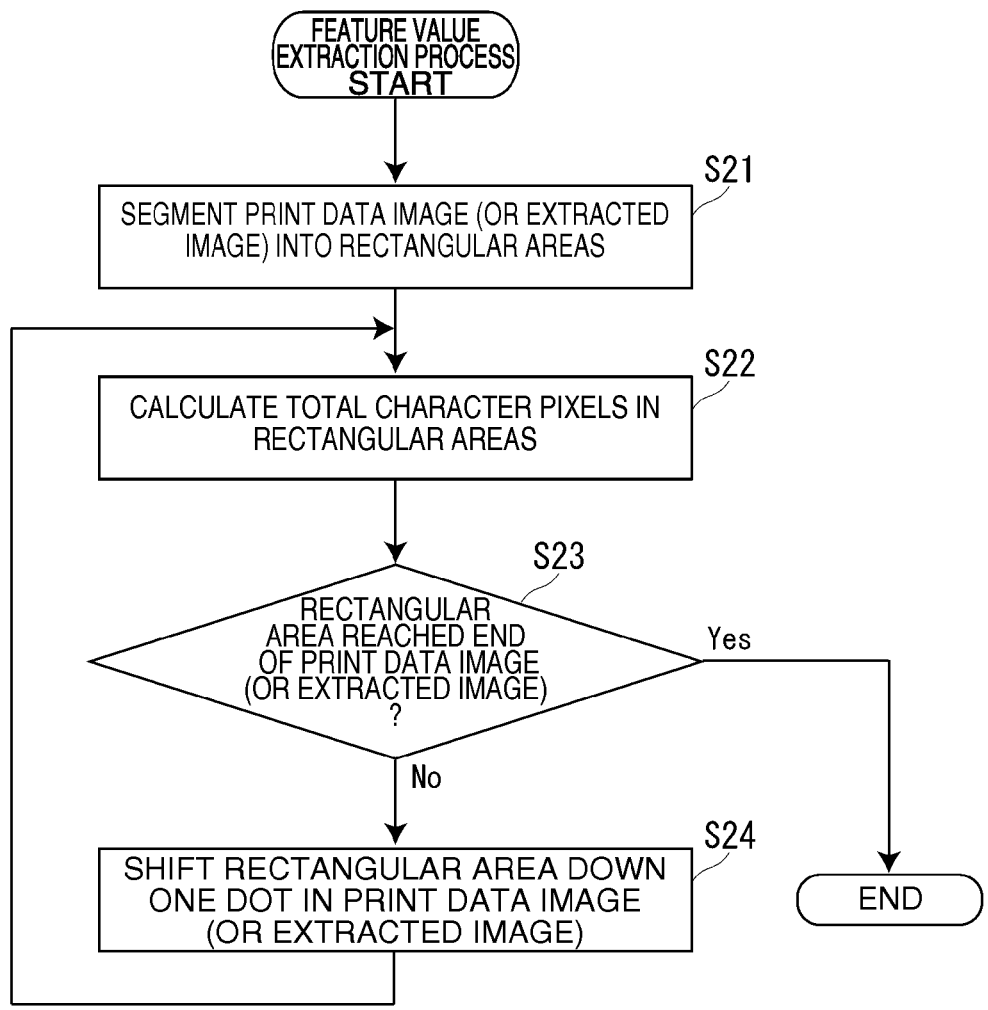
FIG. 6 is a flow chart describing the feature value extraction process (step S08 in FIG. 5) in the first embodiment of the invention.

FIG. 5 is a flow chart of the missing dot detection process according to the first embodiment of the invention, and FIG. 6 is a flow chart of the feature value detection process (step S08) in FIG. 5. FIG. 7 to FIG. 11 are also used to complement description of the missing dot detection process of the first embodiment.

Figures 7A, 7B:
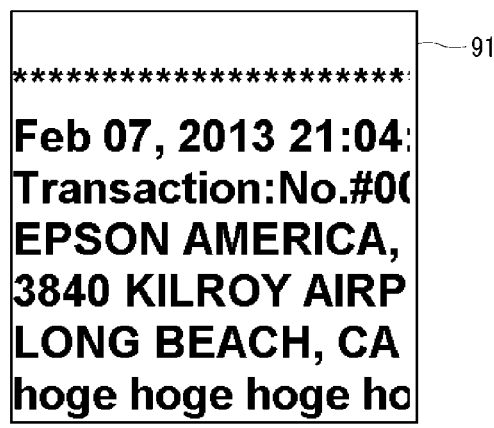
FIG. 7A shows a print data image.
FIG. 7B describes a read image.
Figure 8A:
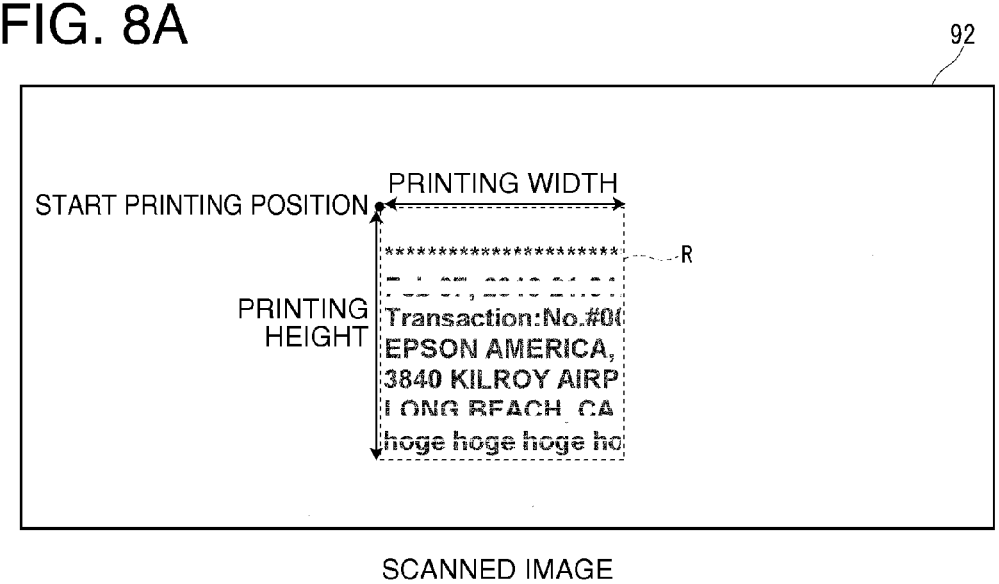
FIG. 8A is used to describe a procedure for identifying the print area in the read image.
Figure 8B:
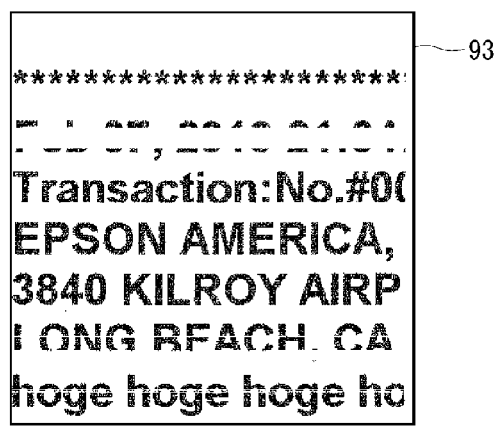
FIG. 8B describes an extracted image extracted from the read image.

As shown in FIG. 5, the multifunction device 1 (missing dot detection controller 81) first acquires a bitmap image (below referred to as a print data image 91 such as shown in FIG. 7A) of the print data to be printed on the back 4b of the check 4 written to the print buffer (not shown in the figure) (S01, functioning as a print data image acquisition unit). This print data image 91 is generated at the print resolution of the inkjet head 10. The print resolution of the inkjet head 10 in this example is 180 dpi. The resolution of the print data image 91 acquired in S01 is therefore 180 dpi.

The multifunction device 1 then applies an image thresholding process (S02) and a resolution conversion process (S03, functioning as a resolution conversion unit) to the acquired print data image 91. The resolution conversion process converts the resolution (180 dpi) of the print data image 91 to the resolution (scanning resolution) of the back CIS unit 48. In this example the scanning resolution of the back CIS unit 48 is 200 dpi. The multifunction device 1 in this example therefore converts the resolution of the print data image 91 from 180 dpi to 200 dpi in the resolution conversion process. The print data image 91 at 200 dpi is used as the reference image (dictionary image) for missing dot detection. Note that if the print resolution of the inkjet head 10 is the same as the scanning resolution of the back CIS unit 48, the resolution conversion process is not performed.

The multifunction device 1 then acquires the image (referred to below as the scanned image 92 as shown in FIG. 7B) captured by the back CIS unit 48 from the back 4b of the check 4 after the printing process is performed based on the print data (S04), and applies the image thresholding process to the scanned image 92 (S05). Note that the scanned image 92 in FIG. 7B shows an example in which missing dots occur at the two locations indicated by the dotted lines, and this embodiment detects that dots are missing in these two locations.

The multifunction device 1 then executes an extraction process that extracts the area that was actually printed from the scanned image 92 (after image thresholding). In this extraction process the multifunction device 1 acquires printing position information indicating the printing position of the print data (the location of the print area R) on the back 4b of the check 4 from the printer driver of the host computer 5 (S06, functioning as a printing position information acquisition unit). This printing position information includes the position where printing on the back 4b of the check 4 starts, the horizontal width of the printed area (printing width), and the height of the printed area (printing height). Based on the acquired printing position information, the multifunction device 1 then identifies the print area R (the area that is actually printed) from the scanned image 92 (see FIG. 8A), and acquires the image (referred to below as the extracted image 93, shown in FIG. 8B) extracted from this print area R (S07, functioning as a print area extraction unit).

The multifunction device 1 detects missing dots by extracting and comparing feature values extracted from the extracted image 93 and the print data image 91 generated as the reference image (the 200-dpi print data image 91). This feature value extraction process (functioning as a character pixel count calculator) is described below.

The feature value extraction process (S08) is described below with reference to the flowchart in FIG. 6. This feature value extraction process is applied to both the print data image 91 and the extracted image 93, but because the process is the same for both, the process is described below applied to the print data image 91.

Figure 9A:
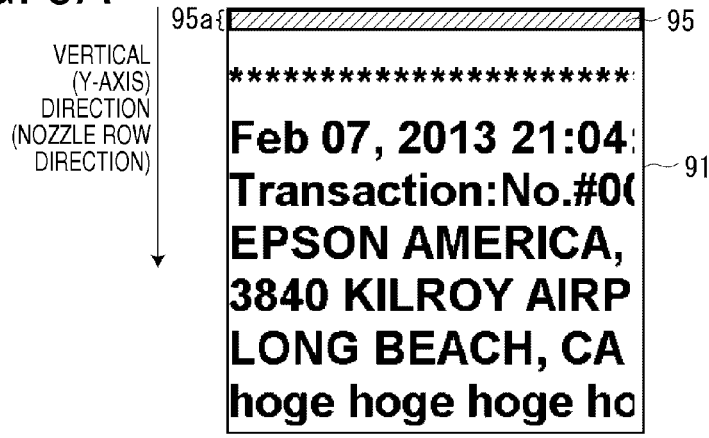
FIG. 9A describes the feature value extraction process.
Figure 9B:
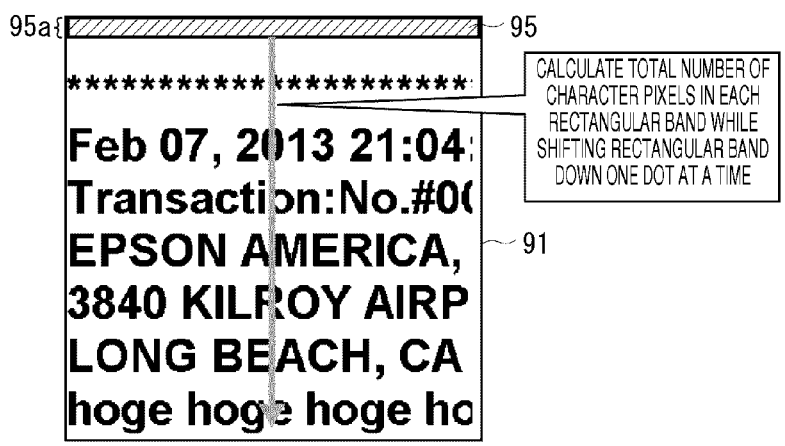
FIG. 9B describes the feature value extraction process.
Figure 9C:
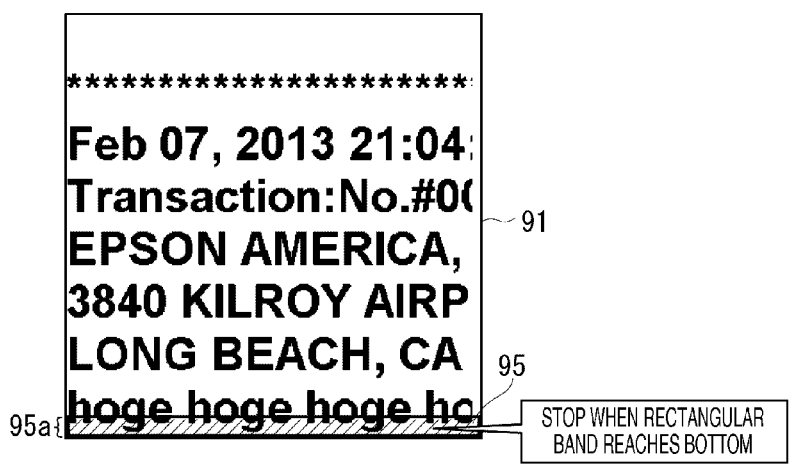
FIG. 9C describes the feature value extraction process.

The multifunction device 1 first segments the print data image 91 into rectangular bands 95 of a specific height 95a in the vertical direction (that is, the nozzle row direction YJ2 shown in FIG. 3) of the print data image 91 (S21, see FIG. 9A). The height 95a of the rectangular bands 95 is set based on the height of the smallest printable font. For example, if the smallest font size that can be printed is 8 points, the height 95a of the rectangular bands 95 is set to 20 dots. By setting the height 95a to 20 dots, missing dots resulting in not printing an entire line can be detected when a string printed in an 8-point font size is scanned at 200 dpi. The height 95a of the rectangular bands 95 could alternatively be set with consideration of the line spacing in addition to the height of the smallest font. Further alternatively, the height 95a could be set based on the width and character spacing of the smallest font depending on the orientation of the printed characters.

Figure 10:
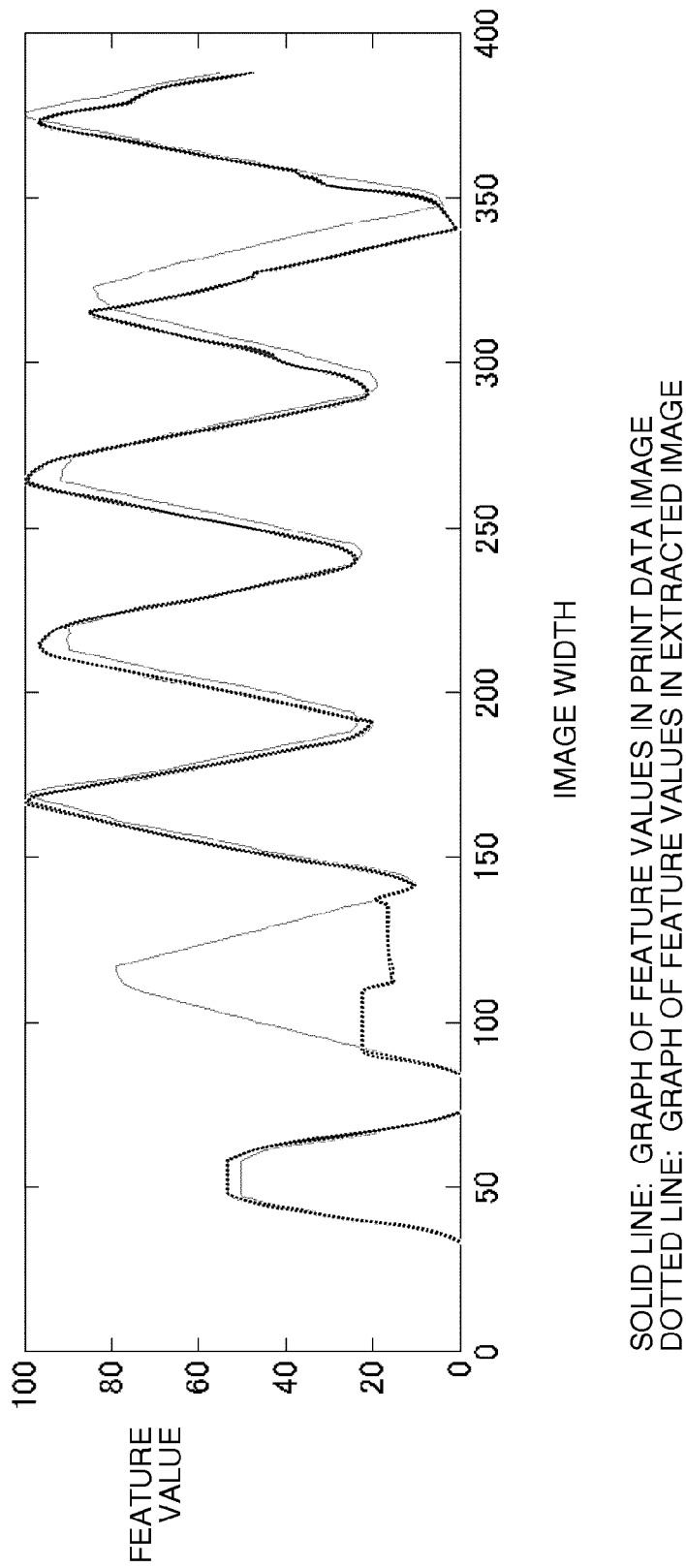
FIG. 10 is a graph showing the feature values of the print data image and extracted image.

Next, the multifunction device 1 then calculates the total number of character pixels (black pixels) in the set rectangular band 95, and extracts the total as a feature value. The multifunction device 1 calculates the total number of character pixels in each rectangular band 95 while shifting the rectangular band 95 from the top of the print data image 91 down (towards the bottom of the print data image 91) one dot at a time until the rectangular band 95 reaches the bottom end of the print data image 91 (S22 to S24, shown in FIG. 9B and FIG. 9C). The calculated feature values are normalized based on the area of the rectangular band 95 as the maximum. By calculating the number of character pixels contained in each rectangular band 95 in the print data image 91 and extracted image 93, the multifunction device 1 can acquire a graph of the feature values of each image as shown in FIG. 10.

Figure 11:
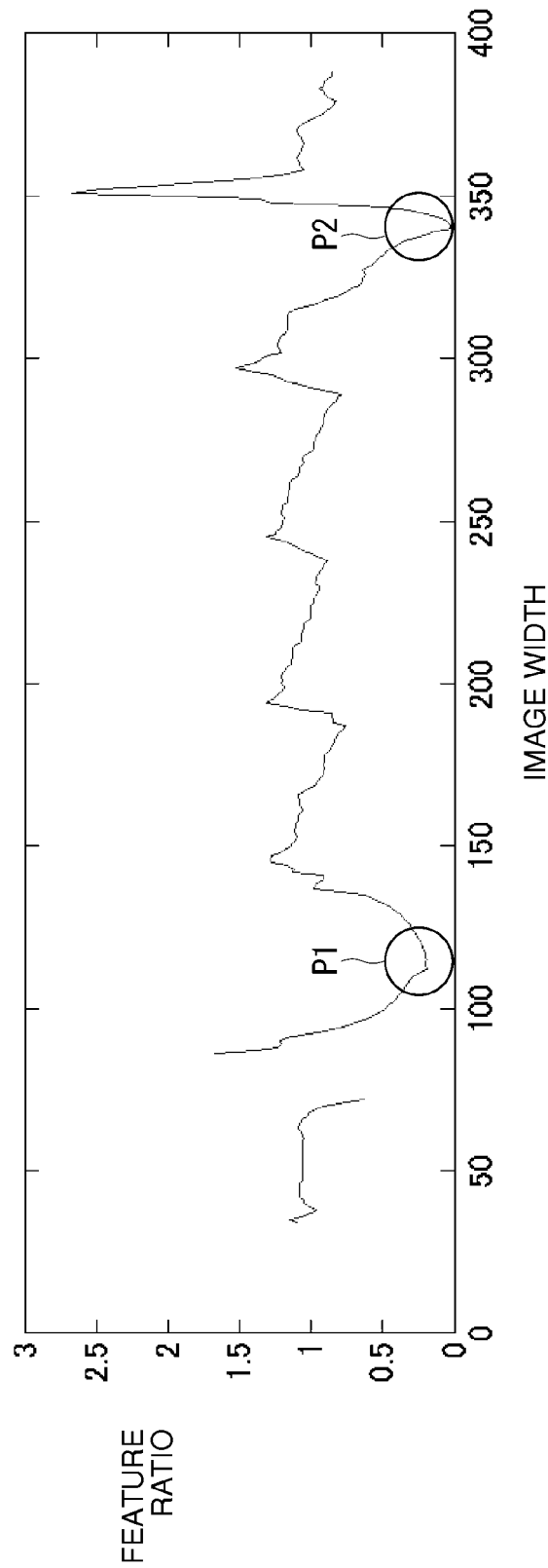
FIG. 11 is a graph showing the ratio of the feature value of the extracted image to the print data image.

Referring again to FIG. 5, after extracting the feature values of the print data image 91 and extracted image 93 in the feature value extraction process (S08), the multifunction device 1 compares the feature values of both images (compares the feature value curves shown in FIG. 10) and calculates the ratio of the feature values of both images (S09, functioning as a ratio calculator). More specifically, the multifunction device 1 calculates the ratio of the feature values of the extracted image 93 to the print data image 91 by dividing the feature values of the extracted image 93 by the feature values of the print data image 91 in each rectangular band 95 in both images (that is, calculates the ratio of the number of character pixels in the extracted image 93 to the number of character pixels in the print data image 91 contained in each rectangular band 95). As a result, a graph showing the ratio of feature values ("feature ratio" below) can be obtained as shown in FIG. 11.

Next, the multifunction device 1 applies a thresholding process to the feature ratio in each rectangular band 95 of both images, and determines if there is a place where the feature ratio is less than or equal to a preset threshold value (S10, functioning as a missing dot evaluation unit). Areas where the feature ratio in rectangular bands 95 of both images exceeds the threshold value are determined to not have missing dots, and areas where the feature ratio in rectangular bands 95 of both images equals or is less than the threshold value are determined to have missing dots. For example, the thresholding process extracts (determines the feature ratio is less than or equal to the threshold value) and determines there are missing dots in areas where there is a large drop in the feature ratio, as at point P1 and point P2 in the graph of feature ratios shown in FIG. 11. This enables detecting that there are missing dots in two places (places where there are consecutive missing dots) in the scanned image 92 shown in FIG. 7B. When missing dots are detected (S11 returns YES), the multifunction device 1 reports the same to the user by printing a message with the thermal printer unit 60 (S12).

As described above, the first embodiment of the invention detects missing dots by calculating and comparing the number of character pixels (black pixel count) in each rectangular band 95 of a specific height 95a in the vertical direction of the image (the nozzle row direction YJ2 of the inkjet head 10) in each of two images (print data image 91 and extracted image 93). More specifically, whether or not the number of missing dots is great enough that the printed characters cannot be read (whether or not dots are not printed by consecutive nozzles N) can be detected by calculating and comparing the number of character pixels and detecting missing dots in the images of areas of a certain width. As a result, whether a large number of dots are missing can be detected more easily and efficiently than when using a conventional method that detects missing dots at each nozzle of the inkjet head 10.

Furthermore, because whether or not there are missing dots is detected using an image based on the print data (the print data image 91) and the result of scanning the image actually printed on the back 4b of the check 4 based on the print data (the scanned image 92) (in other words, because whether or not dots are missing is detected using the data used in the actual printing process and the actual printout) instead of using a test pattern as in the related art, missing dots can be detected even when missing dots start to appear while processing multiple checks 4 continuously.

When missing dots are detected, this embodiment of the invention causes the thermal printer unit 60 to function as a reporting unit to print a report telling the user that dots are missing, but the invention is not so limited. For example, a sound generator (alarm unit) could be driven to beep or speak a message, or an LED (alarm unit) could be driven to report by flashing. Further alternatively, information reporting that missing dots were detected could be displayed on the display screen (a display not shown) of the host computer 5 connected to the multifunction device 1. A combination of such methods could also be used.

Further alternatively, the printing process of the inkjet printer unit 44 can be automatically stopped (interrupted) as soon as missing dots are detected. This configuration can greatly reduce the time and expense associated with repeating a printing process when dots start being missed while printing continuously on the backs 4b of checks 4 with the inkjet printer unit 44 because the printing process does not continue once missing dots are detected.

Further alternatively, a configuration having a switching means that controls whether or not the missing dot detection process of the missing dot detection controller 81 executes (turns missing dot detection on and off) is also conceivable.

An inkjet line head is used as an example of an inkjet head 10 in this embodiment of the invention, but some embodiments of the invention can apparently also be applied when a serial inkjet head is used.

This embodiment of the invention describes detecting missing dots on the multifunction device 1 side, but some embodiments of the invention is not so limited. More specifically, the function of the missing dot detection controller 81 could be rendered by the host computer 5 and missing dots detected on the host computer 5 side.

Embodiment 2

A second embodiment of the invention is described next with reference to FIG. 12A to FIG. 19. The first embodiment described above extracts the print area R of the back 4b of the check 4 based on printing position information. This embodiment differs by extracting an area with margins around the area identified by the printing position information from the scanned image 92, and identifying the print area R from the extracted image with margins. The differences between this and the first embodiment are described below. It should be noted that like parts in this and the first embodiment are identified by like reference numerals, and further description thereof is omitted below. Variations applicable to parts of the first embodiment are also applicable to this embodiment.

As described above, missing dot detection in this second embodiment extracts an area with margins around the area identified by the printing position information from the scanned image 92, and extracts the print area R from the extracted image with margins. When printing on the back 4b of a check 4, conveyance (paper feed) of the check 4 may not be stable, and the actual printing may be at a position offset from the printing position based on the printing position information.

Figure 12A:
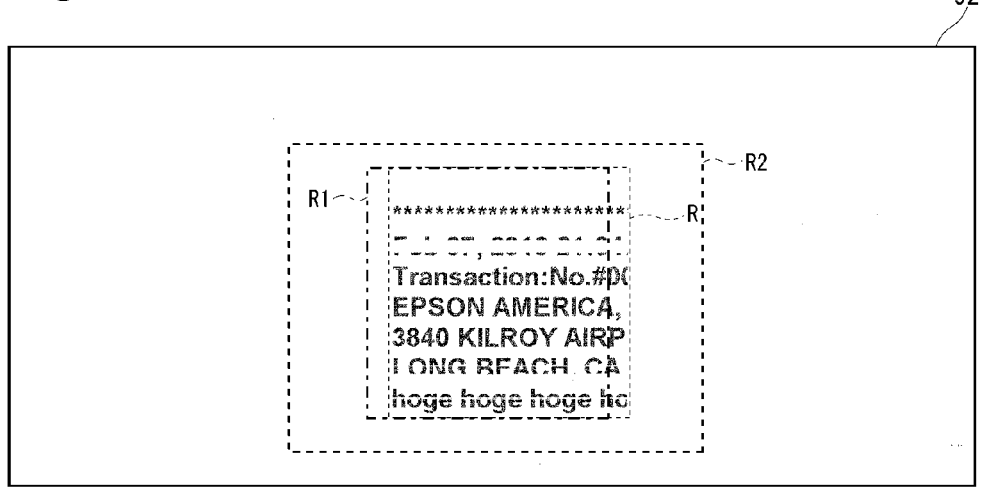
FIGS. 12A and 12B describe the missing dot detection process according to a second embodiment of the invention.
Figure 12B:

As shown in FIG. 12A, for example, the actual printing position (print area R) may be offset from the position of the area identified by the printing position information (the position of print area R1 indicated by the dot-dash line in the figure) in the scanned image 92 due to a problem with conveyance of the check 4. If area R1 is extracted as the extracted image 93 based on the printing position information in this event, the actual printed area (print area R) cannot be extracted (only part of the actual printed area can be extracted), and accurate missing dot detection is not possible. As a result, this second embodiment executes a process that extracts an area with specific margins (referred to below as print area with margins R2) around the area R1 identified by the printing position information from the scanned image 92, and extracts the area that was actually printed from the image of the extracted print area with margins R2 (referred to below as the extracted image with margins 96 (FIG. 12B)). More specifically, this embodiment executes a process that accommodates shifting of the printing position. This process is described in detail below.

Figure 13:
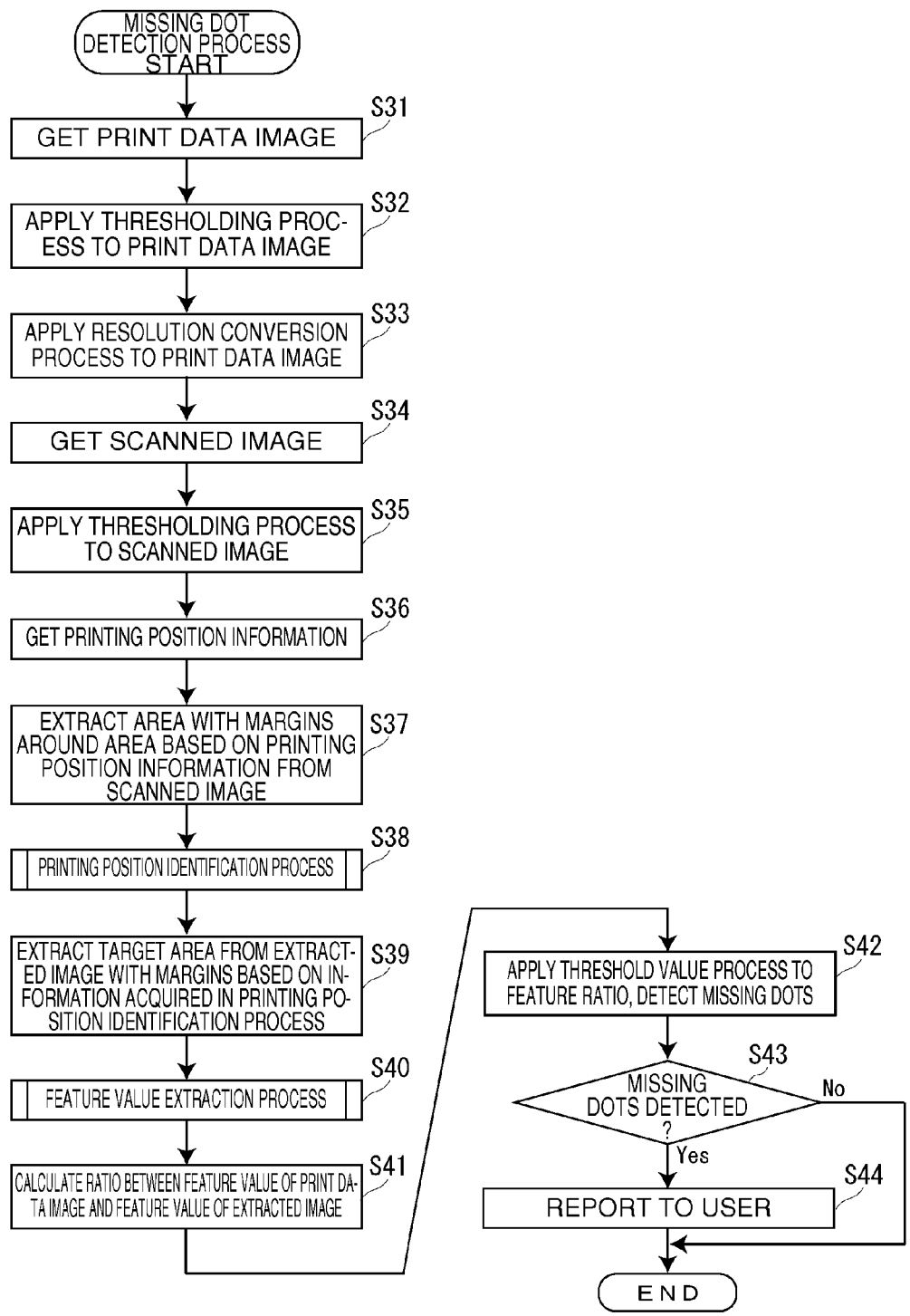
FIG. 13 is a flow chart of the missing dot detection process in the second embodiment of the invention.
Figure 14:
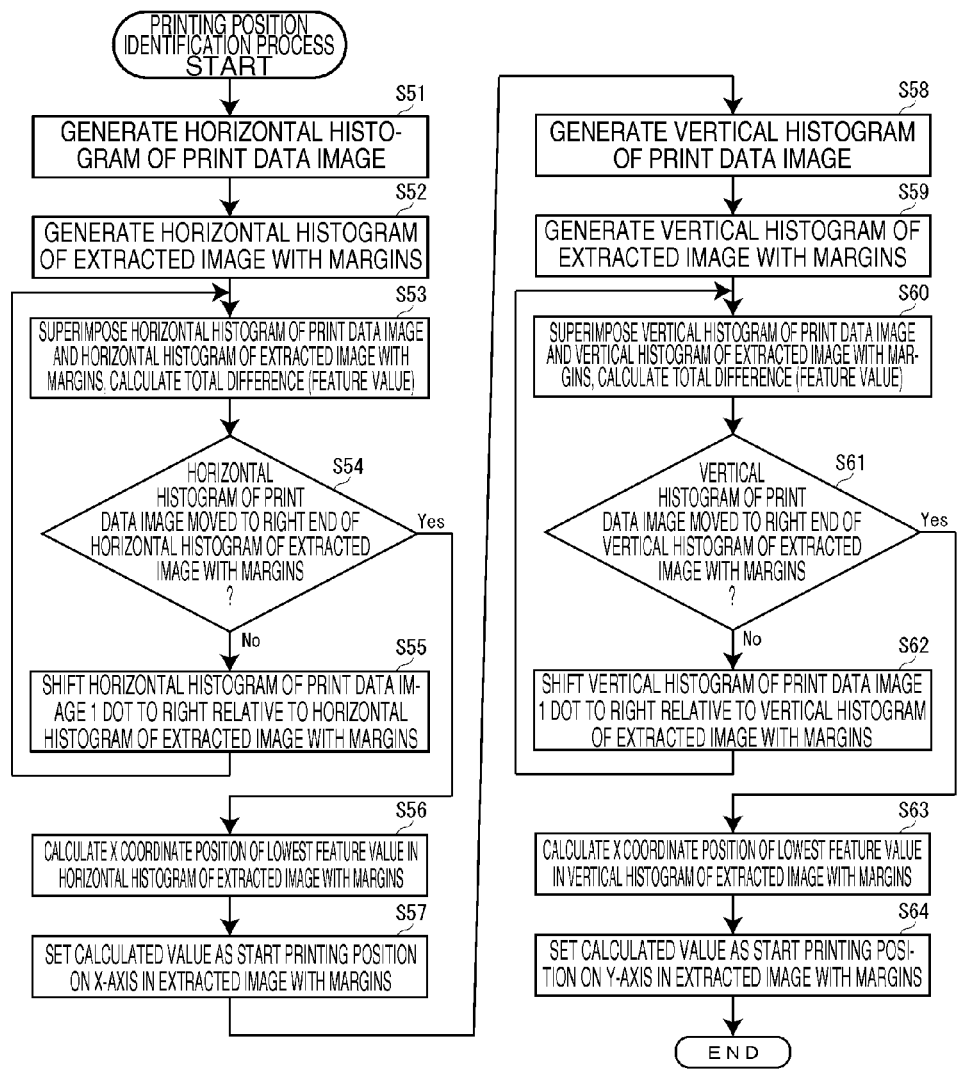
FIG. 14 is a flowchart of the printing position detection process (step S38 in FIG. 13) in the second embodiment of the invention.

FIG. 13 is a flow chart of the missing dot detection process in the second embodiment of the invention, and FIG. 14 is a flow chart of the printing position identification process in step S38 in FIG. 13. FIG. 15 to FIG. 19 are also used to described the missing dot detection process of the second embodiment. Note that steps S31 to S36 and S40 to S44 in FIG. 13 are the same as steps S01 to S06 and S08 to S12 in FIG. 5, and further description thereof is omitted.

As shown in FIG. 13, when the printing position information is acquired (S36), the multifunction device 1 extracts the print area with margins R2 (extracted image with margins 96) having a specific margin around the area identified by the printing position information (S37, functioning as a print area with margins extraction unit). The multifunction device 1 then executes the printing position identification process to identify the printing position in the extracted image with margins 96 (S38). The printing position identification process (S38) is described using the flowchart in FIG. 14.

Figure 15A:
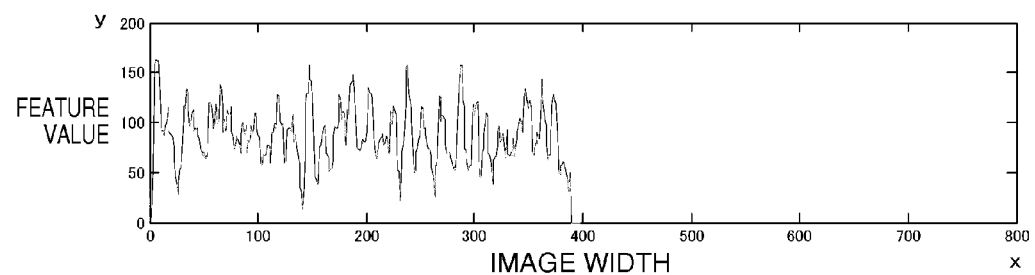
FIG. 15A is a projection histogram of the horizontal axis of the print data image.
Figure 15B:
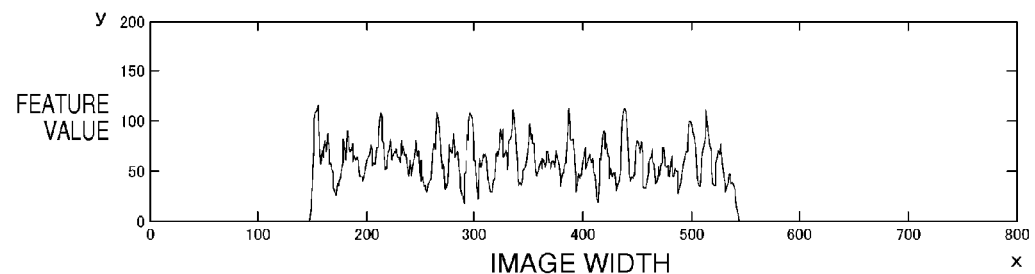
FIG. 15B is a projection histogram of the horizontal axis of an extracted image with margins.

Projection histograms related to the horizontal (x-axis) of the print data image 91 and extracted image with margins 96 are first generated as shown in FIG. 15. As shown in FIG. 14, the multifunction device 1 first counts the number of character pixels (black pixel count) in the vertical direction (y-axis) of the print data image 91, and generates a projection histogram for the horizontal axis of the print data image 91 (referred to below as the horizontal histogram of the print data image, FIG. 15A) (S51, functioning as a histogram generator). The multifunction device 1 then counts the number of character pixels (black pixel count) in the vertical direction (y-axis) of the extracted image with margins 96, and generates a projection histogram for the horizontal axis of the extracted image with margins 96 (referred to below as the horizontal histogram of the extracted image with margins, FIG. 15B) (S52, functioning as a histogram generator).

Figure 16:
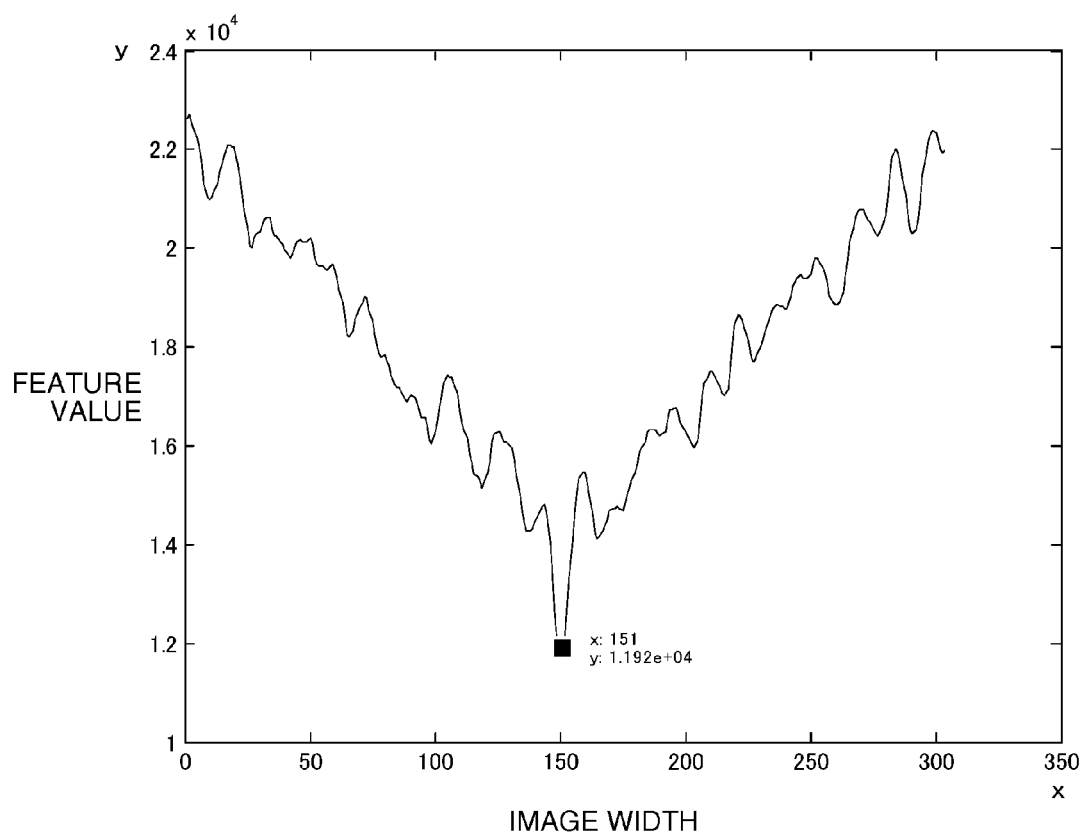
FIG. 16 is a graph showing feature values in a projection histogram of the horizontal axis of the print data image and extracted image with margins.

Next, the multifunction device 1 compares the generated horizontal histogram of the print data image and the horizontal histogram of the extracted image with margins, and calculates the feature value. This process superimposes the horizontal histogram of the print data image and the horizontal histogram of the extracted image with margins, and calculates the total of the absolute values of the differences between the overlapping portions of both histograms while shifting the horizontal histogram of the print data image one dot at a time from the left edge to the right edge of the horizontal histogram of the extracted image with margins until the horizontal histogram of the print data image reaches the right edge of the horizontal histogram of the extracted image with margins (S53 to S55). As a result, a graph of the feature values related to the horizontal axis of both images (the x-axis of the images) can be acquired as shown in FIG. 16.

Next, the multifunction device 1 calculates the X coordinate position of the horizontal histogram of the extracted image with margins where the calculated feature value on the horizontal axis of the image (the total of the absolute values of the differences between the histograms) is smallest (S56), and sets this position as the start printing position on the x-axis (horizontal axis) in the extracted image with margins 96 (S57). More specifically, that the total of the absolute values of the differences between the histograms (feature value) is smallest indicates that that point is the part of greatest similarity to the print data image 91 in the extracted image with margins 96, and the X coordinate position of the horizontal histogram of the extracted image with margins where this feature value is lowest can therefore be determined to be the start printing position on the horizontal axis (x-axis) where the image is actually printed in the extracted image with margins 96. In this example, the position at 151 dots on the x-axis (horizontal axis) from the left edge of the extracted image with margins 96 is determined to be the start printing position (start printing position on the x-axis) from the graph in FIG. 16.

Figure 17A:
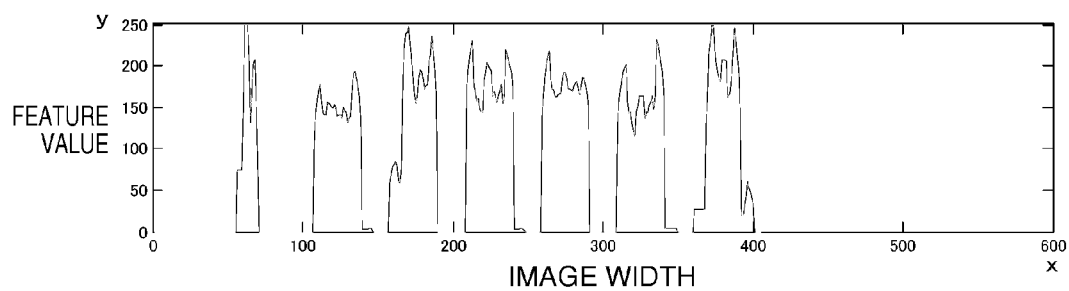
FIG. 17A is a projection histogram of the vertical axis of the print data image.
Figure 17B:
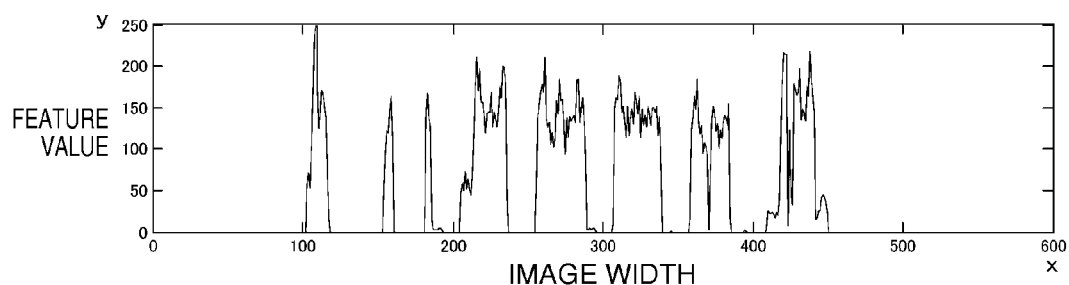
FIG. 17B is a projection histogram of the vertical axis of the extracted image with margins.

Projection histograms related to the vertical (y-axis) of the print data image 91 and extracted image with margins 96 are next generated as shown in FIGS. 17A and B. As shown in FIG. 14, the multifunction device 1 counts the number of character pixels (black pixel count) in the horizontal direction (x-axis) of the print data image 91, and generates a projection histogram for the vertical axis of the print data image 91 (referred to below as the vertical histogram of the print data image, FIG. 17A) (S58, functioning as a histogram generator). The multifunction device 1 then counts the number of character pixels (black pixel count) in the horizontal direction (x-axis) of the extracted image with margins 96, and generates a projection histogram for the vertical axis of the extracted image with margins 96 (referred to below as the vertical histogram of the extracted image with margins, FIG. 17B) (S59, functioning as a histogram generator).

Figure 18:
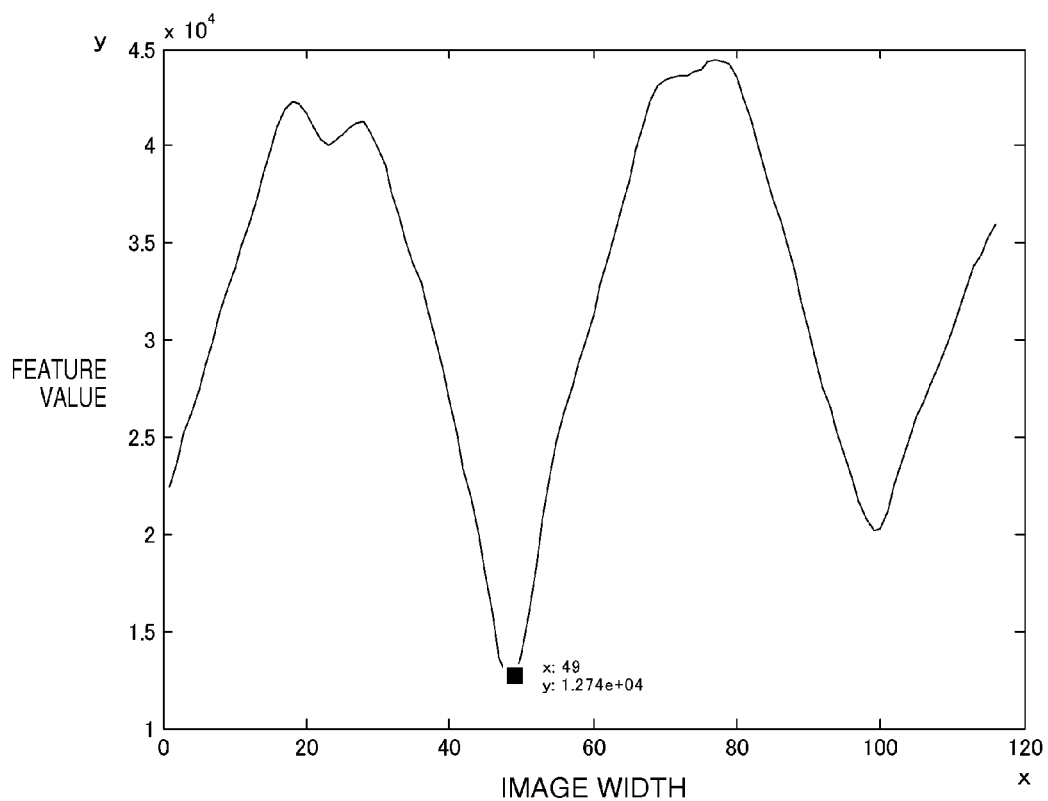
FIG. 18 is a projection histogram of the vertical axis of the print data image and simultaneously with margins.

The multifunction device 1 then compares the vertical histogram of the print data image and the vertical histogram of the extracted image with margins, and calculates the feature value by a procedure similar to that applied to the horizontal histogram described above (S60 to S62). As a result, a graph of the feature values related to the vertical axis of both images (the y-axis of the images) can be acquired as shown in FIG. 18.

Next, the multifunction device 1 calculates the X coordinate position of the horizontal histogram of the extracted image with margins where the calculated feature value on the vertical axis of the image (the total of the absolute values of the differences between the histograms) is smallest (S63), and sets this position as the start printing position on the y-axis (vertical axis) in the extracted image with margins 96 (S64). More specifically, that the total of the absolute values of the differences between the histograms (feature value) is smallest indicates that that point is the part of greatest similarity to the print data image 91 in the extracted image with margins 96, and the X coordinate position of the vertical histogram of the extracted image with margins where this feature value is lowest can therefore be determined to be the start printing position on the vertical axis (y-axis) where the image is actually printed in the extracted image with margins 96. In this example, the position at 49 dots on the y-axis (vertical axis) from the top edge of the extracted image with margins 96 is determined to be the start printing position (start printing position on the y-axis) from the graph in FIG. 18.

Figure 19A:
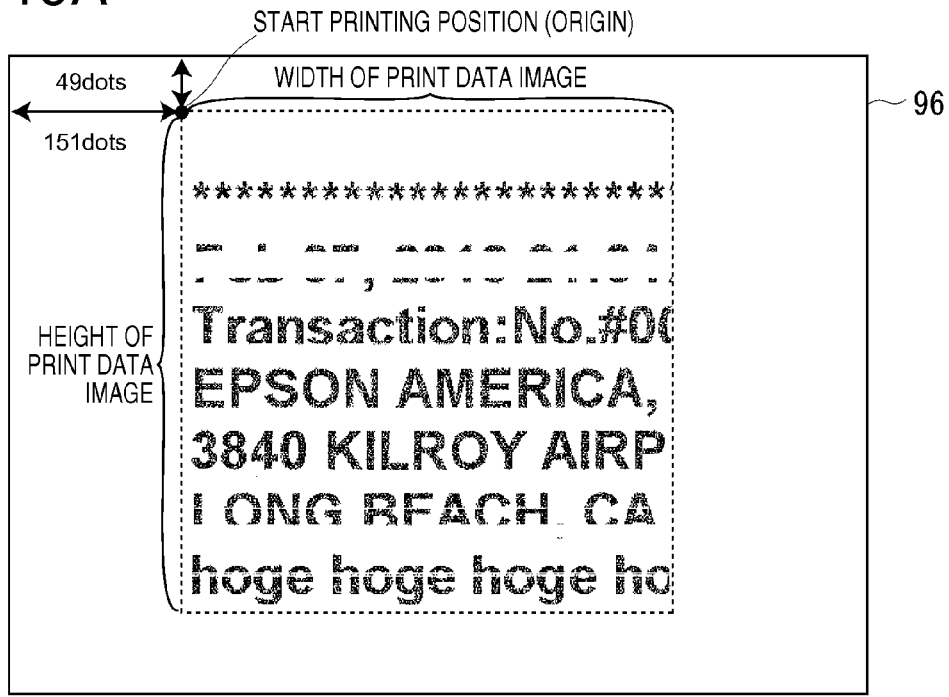
FIG. 19A describes extracting a target area from the extracted image with margins.
Figure 19B:
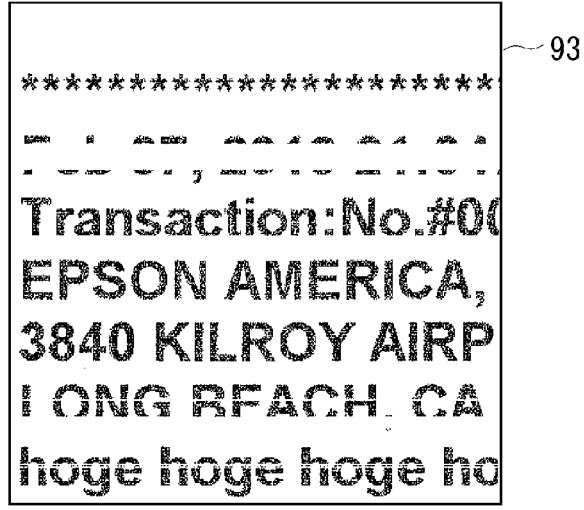
FIG. 19B describes an extracted image extracted from the extracted image with margins.

Referring again to FIG. 13, after acquiring the start printing position in the extracted image with margins 96 from the printing position identification process (S38), the multifunction device 1 extracts the target area from the extracted image with margins 96 based on this start printing position (S39, functioning as a print area extraction unit). More specifically, using the acquired start printing position (the position at 151 dots on the x-axis and 49 dots on the y-axis) as the origin in the extracted image with margins 96, the multifunction device 1 extracts an area of the horizontal and vertical size of the print data image 91 starting from this origin to get the extracted image 93 (FIGS. 19A and B). The multifunction device 1 then looks for missing dots by applying the process from step S40 to the extracted image 93 acquired from the extracted image with margins 96 and the print data image 91.

As described above, this second embodiment of the invention extracts an area with margins (extracted image with margins 96) around the area identified by the printing position information from the scanned image 92 to accommodate shifting in the actual printing position, and compares X and Y projection histograms of this extracted image with margins 96 and the print data image 91 to identify the accurate printing position in the extracted image with margins 96 (specifically, the scanned image 92). As a result, because the accurate location of the print area R in the scanned image 92 can be identified and extracted even if conveyance (paper feed) of the check 4 is not stable and the printing position on the back 4b of the check 4 deviates from the expected printing position (the printing position expected based on the printing position information), accurate comparison with the print data image 91 used for missing dot detection is possible, and false positives can be prevented in missing dot detection. Furthermore, by using y-axis and x-axis projection histograms for two-dimensional positioning, the same effect as a matching process can be achieved at a lower processing cost (calculation cost) than when applying a matching process to two-dimensional images.

Embodiment 3

A third embodiment of the invention is described next with reference to FIG. 20 and FIG. 21. The print area R of the back 4b of the check 4 is identified using printing position information in the first embodiment and second embodiment described above. This embodiment differs by identifying the print area R on the back 4b of the check 4 without using printing position information.

The differences between this and the first and second embodiments are described below. It should be noted that like parts in this and the first and second embodiments are identified by like reference numerals, and further description thereof is omitted below. Variations applicable to parts of the first and second embodiments are also applicable to this embodiment.

Figure 20:
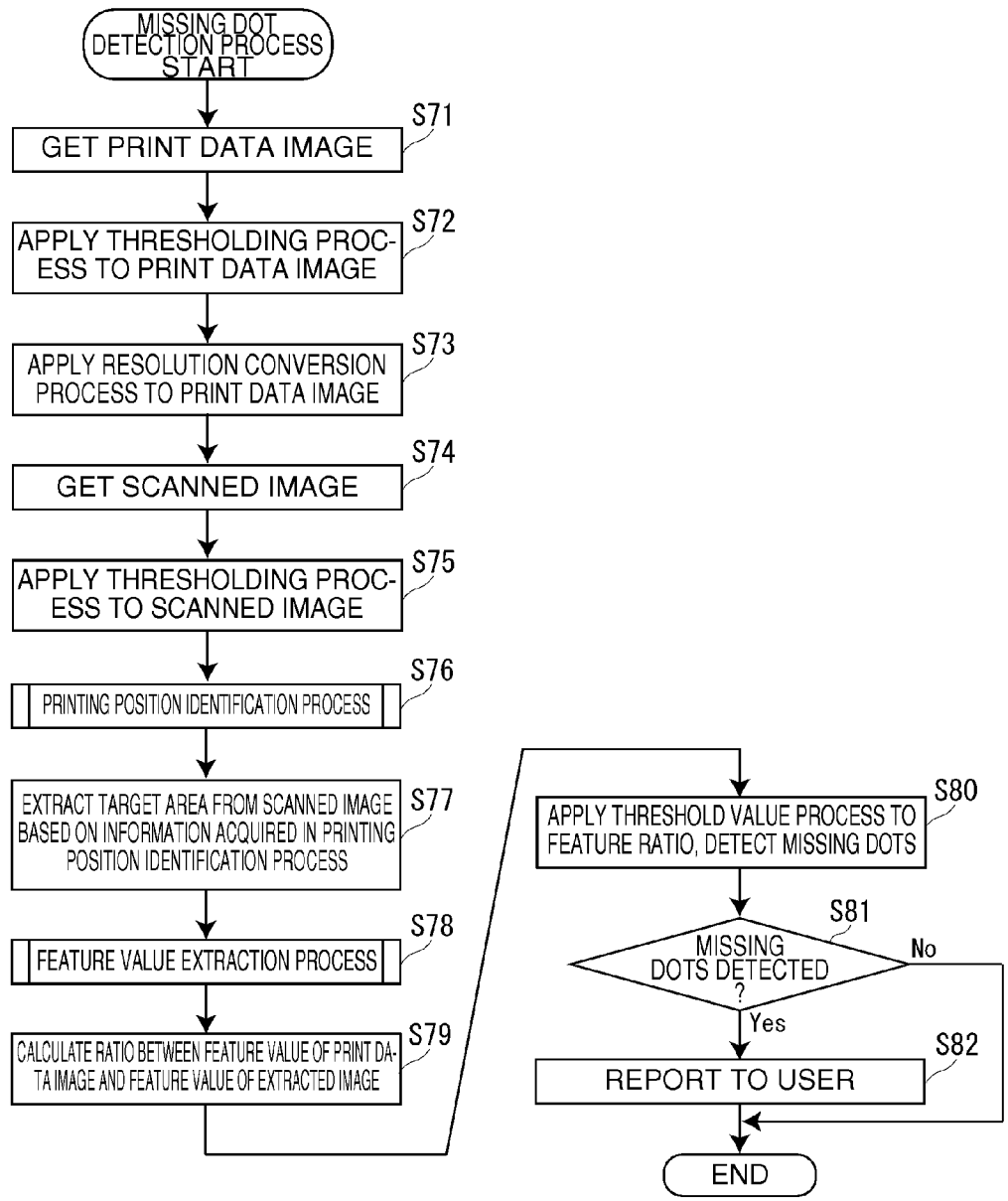
FIG. 20 is a flow chart of the missing dot detection process in a third embodiment of the invention.
Figure 21:
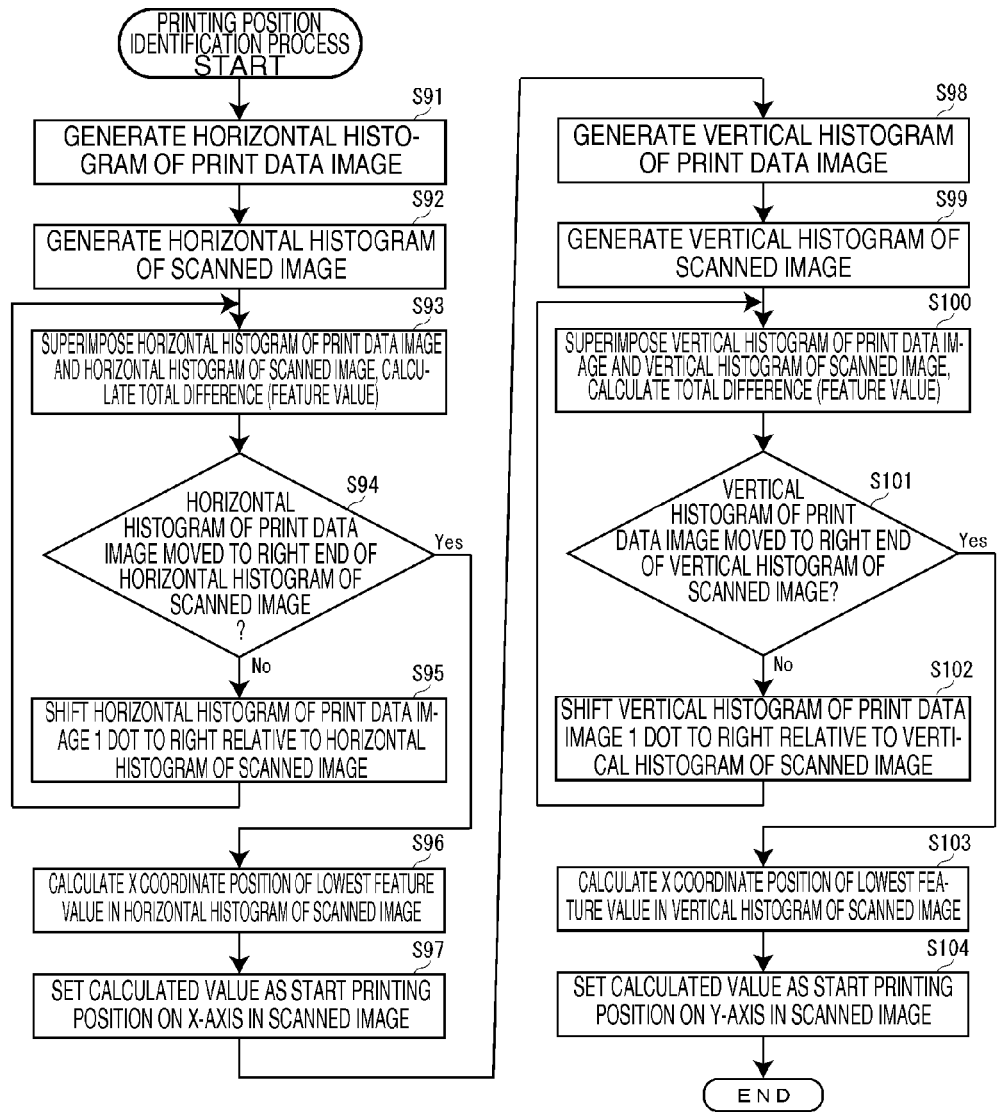
FIG. 21 is a flowchart of the printing position detection process (step S76 in FIG. 20) in the third embodiment of the invention.

FIG. 20 is a flow chart of the missing dot detection process according to the third embodiment of the invention, and FIG. 21 is a flow chart of the printing position identification process (S76) in FIG. 20. The missing dot detection process according to the third embodiment is basically the same as the missing dot detection process according to the second embodiment, and differs from the second embodiment in extracting the actual printing position from the scanned image 92 without using printing position information. As a result, the missing dot detection process shown in FIG. 20 omits steps S36 and S37 (shown in FIG. 13) in the missing dot detection process according to the second embodiment, and in the printing position identification process (S76 in FIG. 20 (S91 to S104 in FIG. 21)), generates a projection histogram for the entire scanned image 92 (horizontal and vertical histograms of the scanned image) instead of the extracted image with margins 96 (functions as a histogram generator). Other aspects of this embodiment are the same as in the second embodiment.

As described above, the third embodiment of the invention identifies the location of the print area R in the scanned image 92 based on the result of comparing X and Y projection histograms of the print data image 91 and the scanned image 92. As a result, the print area R can be accurately identified and extracted from the scanned image 92 even when printing position information cannot be acquired from the host computer 5 (printer driver), accurate comparison with the print data image 91 in missing dot detection is possible, and false positives in missing dot detection can be prevented.

Elements of the multifunction device 1 in the foregoing embodiments can also be embodied as a program. This program can also be provided stored on a suitable non-transitory computer readable recording medium (not shown). Examples of such a recording medium include CD-ROM, flash ROM, memory cards (including CompactFlash (R), smart media, and memory sticks), Compact Disc media, magneto-optical discs, Digital Versatile Disc media, and floppy disks.

The invention is also not limited to the foregoing embodiments, and elements of the multifunction device 1 and steps of the processing method can be desirably changed without departing from the scope of the invention in the following claims.

What is claimed is:

1. An image processing device comprising:
   a print data image acquisition unit that acquires a print data image based on print data;
   a print unit that executes a printing process based on the print data on a recording medium by ejecting ink from an inkjet head with a nozzle row of plural nozzles in a line and forming dots;
   a scanning unit that captures a scanned image of the recording medium after printing thereon by the print unit;
   a print area extraction unit that extracts a printed area of the scanned image of the recording medium captured by the scanning unit as an extracted image; and
   a missing dot detection unit that detects if there are missing dots based on the print data image and the extracted image of the printed area extracted by the print area extraction unit.

2. The image processing device described in claim 1, wherein:
   the missing dot detection unit comprises a character pixel count calculator that calculates a character pixel count in each rectangular area of a specific width in the nozzle row direction of the inkjet head in the print data image and the extracted image,
   a ratio calculator that calculates a ratio of a character pixel count of the extracted image to a character pixel count of the print data image in each rectangular area, and
   a missing dot evaluation unit that determines there are missing dots in the rectangular area when the calculated character pixel count ratio is less than or equal to a preset threshold value.

3. The image processing device described in claim 2, wherein:
   the specific width of the rectangular area is set based at least on a font size of a smallest printable font.

4. The image processing device described in claim 3, wherein:
   the specific width of the rectangular area is set based on a line spacing set in the print data in addition to the font size of the smallest printable font.

5. The image processing device described in claim 1, further comprising:
   a printing position information acquisition unit that acquires printing position information indicating a print area of the print data on the recording medium; wherein
   the print area extraction unit extracts the printed area from the scanned image based on acquired printing position information.

6. The image processing device described in claim 1, further comprising:
   a resolution conversion unit that converts the resolution of the print data image generated based on a print resolution to a resolution of the scanning unit when a print resolution of the inkjet head and the scanning resolution of the scanning unit differ; and
   the character pixel count calculator calculating the character pixel count of the print data image at the converted resolution.

7. The image processing device described in claim 1, further comprising:
   a notification unit that reports when the missing dot detection unit determines there are missing dots.

8. The image processing device described in claim 1, further comprising:
   a histogram generator that counts a number of character pixels on the x-axis and y-axis of the print data image and the scanned image, and generates projection histograms; wherein
   the print area extraction unit extracting the printed area in the scanned image based on a result of comparing the projection histogram of the print data image and the projection histogram of the scanned image generated by the histogram generator.

9. The image processing device described in claim 8, further comprising:
   a printing position information acquisition unit that acquires printing position information indicating a print area of the print data on the recording medium; and
   a print area with margins extraction unit that extracts a print area with margins adding specific margins around the print area based on the printing position information from the scanned image;
   wherein the histogram generator generates a projection histogram of an extracted image with margins indicating the print area with margins.

10. The image processing device described in claim 8, wherein:
    the missing dot detection unit comprises a character pixel count calculator that calculates a character pixel count in each rectangular area of a specific width in the nozzle row direction of the inkjet head in the print data image and the extracted image,
    a ratio calculator that calculates a ratio of the character pixel count of the extracted image to a character pixel count of the print data image in each rectangular area, and
    a missing dot evaluation unit that determines there are missing dots in the rectangular area when the calculated character pixel count ratio is less than or equal to a preset threshold value.

11. A missing dot detection method of an image processing device including a print unit that executes a printing process based on print data on a recording medium by ejecting ink from an inkjet head with a nozzle row of plural nozzles in a line and forming dots, and a scanning unit that captures a scanned image of the recording medium after printing thereon by the print unit, the missing dot detection method comprising:
    acquiring a print data image based on the print data;

extracting a printed area of the scanned image of the recording medium captured by the scanning unit as an extracted image; and detecting if there are missing dots based on the print data image and the extracted image of the printed area extracted from the scanned image.

12. The missing dot detection method of an image processing device described in claim 11, further comprising:

calculating a character pixel count in each rectangular area of a specific width in the nozzle row direction of the inkjet head in the print data image and the extracted image;

calculating the ratio of the character pixel count of the extracted image to the character pixel count of the print data image in each rectangular area; and determining there are missing dots in the rectangular area when the calculated character pixel count ratio is less than or equal to a preset threshold value.

13. The missing dot detection method of an image processing device described in claim 12, further comprising:

setting the specific width of the rectangular area based at least on the font size of the smallest printable font.

14. The missing dot detection method of an image processing device described in claim 13, further comprising:

setting the specific width of the rectangular area based on the line spacing set in the print data in addition to the font size of the smallest printable font.

15. The missing dot detection method of an image processing device described in claim 12, further comprising:

acquiring printing position information indicating a print area of the print data on the recording medium;

extracting the printed area as an extracted image comprises extracting the printed area from the scanned image based on the acquired printing position information.

16. The missing dot detection method of an image processing device described in claim 12, further comprising:

converting the resolution of the print data image generated based on the print resolution to the resolution of the scanning unit when the print resolution of the inkjet head and the scanning resolution of the scanning unit differ; wherein calculating the character pixel count comprises calculating the character pixel count of the print data image at the converted resolution.

17. The missing dot detection method of an image processing device described in claim 12, further comprising:

reporting when the missing dot detection unit determines there are missing dots.

18. The missing dot detection method of an image processing device described in claim 11, further comprising:

counting the number of character pixels on the x-axis and y-axis of the print data image and the scanned image, and generating projection histograms; wherein extracting the printed area in the scanned image extracting the printed area in the scanned image based on the result of comparing the projection histogram of the print data image and the projection histogram of the scanned image that were generated.

19. The missing dot detection method of an image processing device described in claim 18, further comprising:

acquiring printing position information indicating the print area of the print data on the recording medium; and extracting a print area with margins adding specific margins around the print area based on the printing position information from the scanned image;

wherein the generating the projection histograms generates a projection histogram of an extracted image with margins indicating the print area with margins.

20. The missing dot detection method of an image processing device described in claim 18, wherein:

the missing dot detection step comprises calculating the character pixel count in each rectangular area of a specific width in the nozzle row direction of the inkjet head in the print data image and the extracted image, calculating the ratio of the character pixel count of the extracted image to the character pixel count of the print data image in each rectangular area, and determining there are missing dots in the rectangular area when the calculated character pixel count ratio is less than or equal to a preset threshold value.

21. An image processing device comprising:

a controller that acquires a print data image based on print data;

a printer that executes a printing process based on the print data on a recording medium by ejecting ink from an inkjet head with a nozzle row of plural nozzles in a line and forming dots; and a scanner that captures a scanned image of the recording medium after printing thereon by the print unit, wherein the controller extracts a printed area of the scanned image of the recording medium captured by the scanner as an extracted image; and detects if there are missing dots based on the print data image and the extracted image of the printed area.

* * * * *